(12) United States Patent
Iijima et al.

(10) Patent No.: US 6,359,668 B1
(45) Date of Patent: Mar. 19, 2002

(54) DISPLAY DEVICE AND ELECTRONIC APPARATUS USING THE SAME

(75) Inventors: Chiyoaki Iijima, Ina; Seiichi Sakura, Nagano-ken; Toshihiko Tsuchihashi, Matsumoto, all of (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/214,992

(22) PCT Filed: May 13, 1998

(86) PCT No.: PCT/JP98/02107

§ 371 Date: Jan. 13, 1999

§ 102(e) Date: Jan. 13, 1999

(87) PCT Pub. No.: WO98/52094

PCT Pub. Date: Nov. 19, 1998

(30) Foreign Application Priority Data

May 14, 1997 (JP) .............................. 9-124567
Aug. 14, 1997 (JP) .............................. 9-233388
Feb. 9, 1998 (JP) ........................... 10-027664

(51) Int. Cl.⁷ ..................... G02F 1/1335; G02F 1/1333
(52) U.S. Cl. .............................. 349/61; 349/162; 349/8
(58) Field of Search .......................... 349/8, 162, 106, 349/112, 61, 62, 63, 64, 65

(56) References Cited

U.S. PATENT DOCUMENTS

| 4,315,258 A | * | 2/1982 | Mcknight et al. | 340/784 |
| 4,398,805 A | * | 8/1983 | Cole | 350/345 |
| 5,598,300 A | * | 1/1997 | Magnusson et al. | 359/566 |
| 5,808,709 A | * | 9/1998 | Davis et al. | 349/65 |
| 5,986,730 A | * | 11/1999 | Hansen et al. | 349/96 |
| 6,008,871 A | * | 12/1999 | Okumura | 349/61 |
| 6,011,602 A | * | 1/2000 | Miyashita et al. | 349/65 |
| 6,025,897 A | * | 2/2000 | Weber et al. | 349/96 |

FOREIGN PATENT DOCUMENTS

| JP | 9-506984 | * | 7/1997 |
| JP | 9-506985 |   | 7/1997 |
| JP | 9-506985 | * | 3/1998 |
| WO | 95/17692 | * | 6/1995 |
| WO | 95/17699 | * | 6/1995 |
| WO | WO97/08583 |   | 3/1997 |
| WO | WO98/12595 |   | 3/1998 |
| WO | 98/12595 | * | 3/1998 |
| WO | 98/52094 | * | 11/1998 |

* cited by examiner

Primary Examiner—William L. Sikes
Assistant Examiner—Mike Qi
(74) Attorney, Agent, or Firm—Harness, Dickey & Pierce, P.L.C.

(57) ABSTRACT

A retardation film 30 and an upper polarized light separator 20 are provided on the upper side of a liquid crystal cell 10. A diffuser 40, a lower polarized light separator 50, a color filter 60, a PET film 70 and an Al deposited film 80 are provided on the lower side of the liquid crystal cell 10. As the upper polarized light separator 20 and the lower polarized light separator 50, a polarized light separator (reflective polarizer) is used, which reflects linearly-polarized light in one direction as linearly-polarized light in the one direction, and transmits linearly-polarized light in another direction perpendicular to the one direction as linearly-polarized light in the other direction. The light emitted from LED 120 is introduced into a light guide plate 130 between the upper polarized light separator 20 and the retardation film 30 through a light guide 110. Then the light is emitted from the lower side of the light guide plate 130 to the liquid crystal cell 10.

10 Claims, 22 Drawing Sheets

(a)

(b)

(c)

(d)

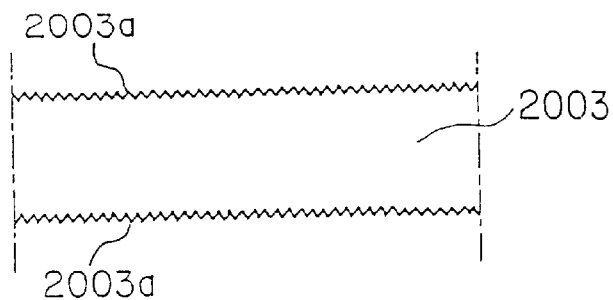
Fig. 18(a)
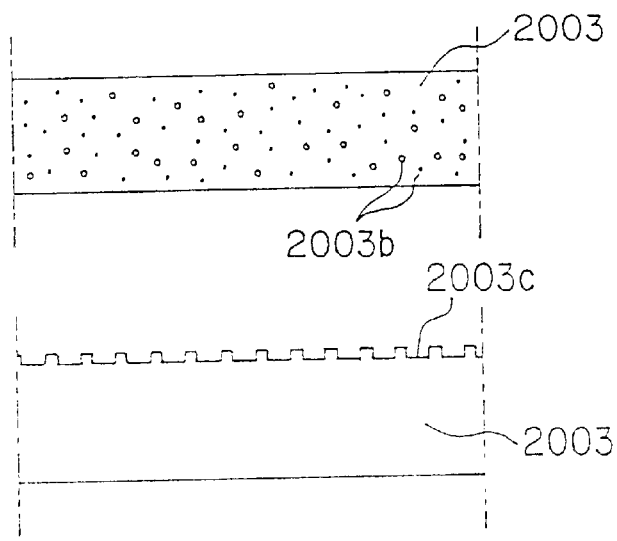
Fig. 18(b)
Fig. 18(c)
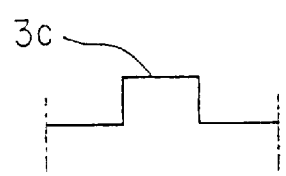 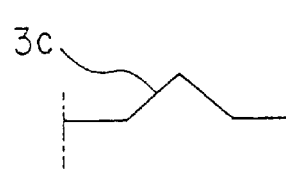 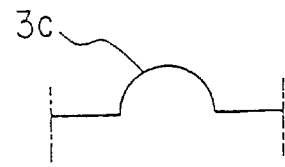
Fig. 19 (a)   Fig. 19 (b)   Fig. 19 (c)

US 6,359,668 B1

DISPLAY DEVICE AND ELECTRONIC APPARATUS USING THE SAME

TECHNICAL FIELD

The present invention relates to the technical field of a display device, and particularly to the technical field of a display device such as a liquid crystal display device or the like which can be used as both a reflective display type utilizing reflection of external light and a transmissive type utilizing transmission of light from a light source, and an electronic apparatus using the display device, such as a portable telephone, a watch, or the like.

BACKGROUND ART

In a conventional reflective display device performing display by using external light, display is made hard to see in dark in accordance with decreases in the quantity of light. On the other hand, in a transmissive display device performing display by using a light source such as a back light or the like, the power consumption is increased by the amount corresponding to the light source regardless of the brightness of place, and particularly it is unsuitable as a portable display device operated by a battery. Therefore, in a transflective display device which can be used as both the reflective and transmissive display devices, mainly in the light, light being incident from the display screen is reflected by a semi-reflecting film provided in the device, and at the same time, the quantity of light emitted from the display screen is controlled for each pixel by using a liquid crystal, an optical element such as a polarized light separator or the like, which are arranged on the optical path, to perform reflective display. On the other hand, mainly in the dark, from the back of the semi-reflecting film, the light is irradiated from the light source, and at the same time, the quantity of light emitted from the display screen is controlled for each pixel by using the above mentioned liquid crystal, the optical element such as a polarized light separator or the like to perform transmissive display.

In a conventional liquid crystal display device utilizing a variable transmission polarization axis optical element making the polarization axis of transmitted light to be rotated, such as a TN (Twisted Nematic) liquid crystal, a STN (Super-Twisted Nematic) liquid crystal or the like, a structure is employed in which the variable transmission polarization axis optical element is held between two polarizers. A polarizer as an example of polarized light separators polarizes incident light by absorbing a polarized light component in a direction different from the polarization axis in a predetermined direction, and thus exhibits poor efficiency of light utilization. Particularly, in the above liquid crystal display device which can be used as both the reflective and transmissive display devices, in reflective display, light is reflected by the semi-reflecting film, thereby further deteriorating the efficiency of light utilization. Therefore, there is the problem of dark display in reflective display.

A conventional transflective display device using a TN liquid crystal panel as variable transmission polarization axis means is described with reference to FIG. 31. FIG. 31 is a sectional view of a conventional transflective display device.

In FIG. 31, the display device comprises an upper polarizer 5130, a TN liquid crystal panel 5140, a lower polarizer 5170, a transflector 5180, and a light source 5210. Although, in FIG. 31, the respective portions are shown as separate portions for the sake of clarity, the portions are, in fact, closely arranged. The upper polarizer 5130 and the lower polarizer 5170 are arranged so that the transmission polarization axes thereof are perpendicular to each other in order to perform normally white display.

White display in reflective display is described. The light shown on the optical path 5111 is changed to linearly-polarized light parallel to the drawing by the upper polarizer 5130, and the polarization axis is twisted for 90° by the TN liquid crystal panel 5140 to produce linearly-polarized light perpendicular to the drawing. The linearly-polarized light is transmitted through the lower polarizer 5170 keeping perpendicular to the drawing, and reflected by the transflector 5180, with a part transmitted. The reflected light is again transmitted as linearly-polarized light perpendicular to the drawing through the lower polarizer 5170, and the polarization axis is twisted for 90° by the TN liquid crystal panel 5140 to produce linearly-polarized light parallel to the drawing, which is then emitted from the upper polarizer 5130.

Since each of the upper polarizer 5130 and the lower polarizer 5170 is a polarized light separator accompanied with absorption respectively, a part of light is absorbed during the transmissions through the upper polarizer 5130 and the lower polarizer 5170 twice for each. Furthermore, some light is transmitted through the transflector 5180 and travels toward the light source 5210, and is not used for display. As a result, the conventional transflective liquid crystal display device exhibits a low efficiency of light utilization, and thus has the problem of darkening the display screen, particularly, in reflective display.

Therefore, the inventors proposed a transflective display device described in Japanese Patent Application No. 8-245346, which had not been published, as yet, on the priority date of this application, in which the lower polarizer and the transflector, which are on the light source side, are substituted with a reflective polarizer, which is an example of polarized light separators to reflect the light of a linearly-polarized component in a predetermined direction and also to transmit the light of a linearly-polarized component being in the direction perpendicular to the predetermined direction. In this display device, the efficiency of reflection is increased by the polarized light separator to obtain bright display. Also a display device using a reflective polarizer is disclosed in the Published Japanese Translations of PCT International Publication for Patent applications No. 9-506985 (International Publication No. WO/95/17692) and International Publication No. WO/95/27819).

Description will now be made on the transflective display device using the reflective polarizer proposed by the inventors in Japanese Patent Application No. 8-245346, with reference to FIG. 32.

In FIG. 32, the display device comprises the upper polarizer 5130, an upper glass substrate 5302, a lower glass substrate 5304, a polarized light separator 5160, a transflective light absorption film 5307, and the light source 5210. The display device further comprises a TN liquid crystal panel held between the upper glass substrate 5302 and the lower glass substrate 5304, the TN liquid crystal panel includes a voltage applied region 5110 and a voltage unapplied region 5120. Particularly, the polarized light separator 5160 comprises a reflective polarizer.

First, white and black display in reflective display is described. The light, which is shown on the optical path 5601 and is incident from the outside of the display device, is changed to linearly-polarized light parallel to the drawing by the upper polarizer 5130, and then, the polarization direction of it is twisted for 90° by the voltage unapplied region 5120 of the TN liquid crystal panel to produce light of a linearly-polarized component being in the direction perpendicular to the drawing. After that the light is reflected by the polarized light separator 5160 as it is a linearly-polarized component light perpendicular to the drawing, and then the polarization direction is twisted for 90° by the TN liquid crystal panel to produce light of a linearly-polarized component parallel to the drawing, which is then emitted from the upper polarizer 5130. Therefore, with no voltage applied to the TN liquid crystal panel, white display is obtained. In this way, the light of white display is the light reflected by the polarized light separator 5160 which selectively reflects most of the linearly-polarized light transmitted through the upper polarizer 5130, thereby obtaining brighter display than the conventional display device (refer to FIG. 31) using the transflector for simply partly reflecting the light transmitted through the polarizer. The light shown on the optical path 5603 is changed to linearly-polarized light parallel to the drawing by the upper polarizer 5130, then transmitted as linearly-polarized light parallel to the drawing through the voltage applied region 5110 of the TN liquid crystal panel without a change in the polarization direction, and further transmitted through the polarized light separator 5160 without a change in the polarization direction, and then absorbed by the transflective light absorbing layer 5307 to produce black display.

On the other hand, in transmissive display, the light from the light source 5210, which is shown on the optical path 5602, is transmitted through the opening provided in the transflective light absorbing layer 5307 and changed to linearly-polarized light parallel to the drawing by the polarized light separator 5160 (namely, the polarized component being in the direction perpendicular to the drawing is reflected by the lower side of the polarized light separator 5160 and absorbed by the transflective light absorbing layer 5307). Then the polarization direction is twisted for 90° by the voltage unapplied region 5120 of the TN liquid crystal panel to produce linearly-polarized light perpendicular to the drawing, which is absorbed by the upper polarizer 5130 to obtain black display. The light on the optical path 5604 is transmitted through the opening provided in the transflective light absorbing layer 5307, and changed to linearly-polarized light parallel to the drawing by the polarized light separator 5160, and then transmitted as linearly-polarized light parallel to the drawing through the upper polarizer 5130 without a change in the polarization direction at the voltage applied region 5110 of the TN liquid crystal panel to obtain white display.

In this way, the transflective display device using a reflective polarizer as a polarized light separator, which was proposed by the inventors in Japanese Patent Application No. 8-245346, is capable of performing reflective display using external light in the bright place, and transmissive display using the light from a light source in the dark place.

However, as described above with reference to FIG. 32, in the transflective display device using the reflective polarizer as a polarized light separator, light reflected by the reflective polarizer is used for display in transmissive display, while light transmitted through the reflective polarizer is used for display in reflective display. Therefore, in transmissive display, a portion where a voltage is applied to the liquid crystal panel (the polarization direction is not twisted by the TN liquid crystal) produces white display, i.e., negative display is performed. In reflective display, a portion where a voltage is not applied to the liquid crystal panel (the polarization direction is twisted for 90° by the TN liquid crystal) produces white display, i.e., positive display is performed. Namely, in reflective display, a display, in which white and black are the reverse of the display in transmissive display, is performed. In this way, the display device proposed by the inventors in Japanese Patent Application No. 8-245346 has the problem of causing so-called "positive-negative reversal" between transmissive display and reflective display.

SUMMARY OF THE INVENTION

The present invention has been achieved for solving the above problem, and an object of the present invention is to provide a display device using a variable transmission polarization axis optical element such as a liquid crystal or the like, causing no positive-negative reversal both in reflective display using external light and transmissive display using the light from a light source, and capable of producing bright display, and also to provide an electronic apparatus using the display device.

The above objects of the present invention can be achieved by a display device comprising variable transmission polarization axis means capable of changing the transmission polarization axis, first polarized light separating means arranged on the one side of the variable transmission polarization axis means, for transmitting light of a linearly-polarized component in a first direction and for reflecting light of a linearly-polarized light component in a predetermined direction different from the first direction, second polarized light separating means arranged on the other side of the variable transmission polarization axis means for transmitting light of a linearly-polarized component in a second direction and for reflecting or absorbing light of a linearly-polarized component in a predetermined direction different from the second direction, and light source means for making light to be incident from between the first and second polarized light separating means.

According to this display device, on the one side of the variable transmission polarization axis means, the first polarized light separating means transmits a linearly-polarized light component in the first predetermined direction, out of the light being incident from the variable transmission polarization axis means side, to the side opposite to the variable transmission polarization axis means side, and reflects a linearly-polarized light component being in the predetermined direction (for example, perpendicular or substantially perpendicular to the first direction) different from the first predetermined direction to the variable transmission polarization axis means side. On the other side of the variable transmission polarization axis means, the second polarized light separating means transmits a linearly-polarized light component being in the second predetermined direction, out of the light being incident from the variable transmission polarization axis means, to the side opposite to the variable transmission polarization axis means side, and reflects to the variable transmission polarization axis means side or absorbs a linearly-polarized light component being in the predetermined direction (for example, perpendicular or substantially perpendicular to the second direction) different from the second predetermined direction.

In this way, the first polarized light separating means transmits a linearly-polarized light component being in the first direction being incident from the variable transmission polarization axis means side, and reflects a linearly-polarized light component different from the first linearly-polarized light component in order to perform the separation of the polarized light. Therefore, this display device can obtain brighter display because it utilizes the reflected linearly-polarized light, as compared with a conventional display device using a polarizer which performs the separation of the polarized light by transmitting a linearly-polarized light component in a certain direction and absorbs the other linearly-polarized light component being in the direction perpendicular to the aforementioned one linearly-polarized light component.

Furthermore, in this display device, since light is incident between the first polarized light separating means and the second polarized light separating means from the light source means, it means that the light is incident from the upper side relative to the first polarized light separating means. Namely, like in the case of external light in reflective display, the light from the light source is made to be incident to the first polarized light separating means from the upper side. Therefore, unlike in the display device proposed by the inventors in Japanese Patent Application No. 8-245346, the light from the light source of the subject display device is not incident from the lower side, thereby causing no negative-positive reversal. Also freedom of the arrangement position of the light source is increased to increase design freedom of the display device.

In the display device in accordance with an embodiment of the present invention, the first polarized light separating means comprises a reflective polarizer which transmits light of a linearly-polarized light component being in the first direction, and reflects light of a linearly-polarized light component being in the direction perpendicular to the first direction.

In this embodiment, the reflective polarizer transmits the linearly-polarized light component, out of the light being incident from the variable transmission polarization axis means side, which is in the first predetermined direction as a linearly-polarized light component, which is in the first predetermined direction, to the side opposite to the variable transmission polarization axis means side, and reflects the linearly-polarized light component which is in the direction perpendicular to the first predetermined direction as a linearly-polarized light component, which is in the direction perpendicular to the first predetermined direction, to the variable transmission polarization axis means side. Also, out of the light being incident from the side opposite to the variable transmission polarization axis means side, the linearly-polarized light component being in the first predetermined direction is transmitted as a linearly-polarized light component being in the first predetermined direction, to the variable transmission polarization axis means side, the linearly-polarized light component being in the direction perpendicular to the first predetermined direction is reflected as a linearly-polarized light component being in the direction perpendicular to the first predetermined direction, to the side opposite to the variable transmission polarization axis means side.

Furthermore, in this embodiment, the reflective polarizer may comprise a laminate in which a first layer having birefringence and a second layer having a refractive index substantially equal to any one of the plurality of refractive indexes of the first layer, and no birefringence are alternately laminated.

In the reflective polarizer having the above construction, out of the light being incident on one of the main surface of the reflective polarizer from the lamination direction, the light of a linearly-polarized component being in the first direction is transmitted as a linearly-polarized light component being in the first direction to the other main surface side located on the opposite side, and the linearly-polarized light component being in the direction perpendicular to the first direction is reflected as a linearly-polarized light component being in the direction perpendicular to the first direction. While, out of the light being incident on the other main surface of the reflective polarizer from the lamination direction, the linearly-polarized light component being in the first direction is transmitted as a linearly-polarized light component being in the first direction to the one main surface side, located on the opposite side, and the linearly-polarized light component being in the direction perpendicular to the first direction is reflected as a linearly-polarized light component being in the direction perpendicular to the first direction.

In a display device in accordance with another embodiment of the present invention, the second polarized light separating means comprises a reflective polarizer which transmits a linearly-polarized light component being in the second direction and reflects a linearly-polarized light component being in the direction perpendicular to the second direction.

In this embodiment, the reflective polarizer reflects the linearly-polarized light component being in the second predetermined direction, out of the light being incident from the variable transmission polarization axis means side, as a linearly-polarized light component being in the second predetermined direction to the side opposite to the variable transmission polarization axis means side, and reflects the linearly-polarized light component being in the direction perpendicular to the second predetermined direction as a linearly-polarized light component being in the direction perpendicular to the second direction to the variable transmission polarization axis means side. Also, out of the light being incident from the side opposite to the variable transmission polarization axis means side, the linearly-polarized light component being in the second predetermined direction is transmitted as a linearly-polarized light component being in the second predetermined direction to the variable transmission polarization axis means side, and the linearly-polarized light component being in the direction perpendicular to the second predetermined direction is reflected as a linearly-polarized light component being in the direction perpendicular to the second predetermined direction to the side opposite to the variable transmission polarization axis means side.

Therefore, out of the light emitted from the light source, the linearly-polarized light component being in the second predetermined direction is transmitted to the side opposite to the variable transmission polarization axis means side, and further the linearly-polarized light component being in the direction perpendicular to the second predetermined direction is partially repeatedly reflected in the display device, and finally passed through the reflective polarizer and emitted to the side opposite to the variable transmission polarization axis means side. Therefore, when display is performed by using the light from the light source, the brighter display can be obtained as compared with the case using the polarizer as the second polarized light separating means.

Furthermore, in this embodiment, the reflective polarizer may comprise a laminate in which a first layer having birefringence and a second layer having a refractive index substantially equal to any one of the plurality of refractive indexes of the first layer, and no birefringence are alternately laminated.

In the reflective polarizer having the above construction, out of the light being incident on a main surface of the reflective polarizer from the lamination direction, light of a linearly-polarized component being in the second direction is transmitted as a linearly-polarized light component being in the second direction to the other main surface side on the opposite side, and the linearly-polarized light component being in the direction perpendicular to the second direction is reflected as a linearly-polarized light component being in the direction perpendicular to the second direction. While, out of the light being incident on the other main surface of the reflective polarizer from the lamination direction, the linearly-polarized light component being in the second direction is transmitted as a linearly-polarized light component being in the second direction to the one main surface located on the opposite side, and the linearly-polarized light component being in the direction perpendicular to the second direction is reflected as a linearly-polarized light component being in the direction perpendicular to the second direction.

In a display device in accordance with still another embodiment of the present invention, the second polarized light separating means comprises a polarizer which transmits a linearly-polarized light component being in the second direction and absorbs a linearly-polarized light component being in the direction perpendicular to the second direction.

In the polarizer of this embodiment, out of the light being incident from the variable transmission polarization axis means side, the linearly-polarized light component being in the second predetermined direction is transmitted as a linearly-polarized light component being in the second predetermined direction to the side opposite to the variable transmission polarization axis means side, and the linearly-polarized light component being in the direction perpendicular to the second predetermined direction is absorbed. Also, out of the light being incident from the side opposite to the variable transmission polarization axis means side, the linearly-polarized light component being in the second predetermined direction is transmitted as a linearly-polarized light component being in the second predetermined direction to the variable transmission polarization axis means side, and the linearly-polarized light component being in the direction perpendicular to the second predetermined direction is absorbed.

A display device in accordance with a further embodiment of the present invention further comprises an optical element arranged on the side opposite to the variable transmission polarization axis means side with respect to the first polarized light separating means so that of the light from the first polarized light separating means, light in a predetermined wavelength region is emitted to the first polarized light separating means.

In this embodiment, in observation of the display device from the second polarized light separating means side, for the light, which is incident between the first polarized light separating means and the second polarized light separating means from the light source means, two display states, namely, the first display state due to the light reflected by the first polarized light separating means and the second display state due to the light, which is emitted from the optical element with predetermined wavelength region and transmitted through the first polarized light separating means, are obtained depending on the conditions of the transmission polarization axis of the variable transmission polarization axis means. Since, the first display state is a display state due to the light reflected from the first polarized light separating means, bright display can be obtained.

On the other hand, for external light from the outside of the second polarized light separating means, two display states namely, the third display state due to light reflected by the first polarized light separating means and the fourth display state due to light, which is emitted from the optical element with the predetermined wavelength region and transmitted through the first polarized light separating means, are obtained depending on the condition of transmission polarization axis of the variable transmission polarization axis means. Since, the third display state is a display state due to the light reflected from the first polarized light separating means, bright display can be obtained.

Furthermore, the two display states (bright and dark), which are obtained depending on the conditions of transmission polarization axis of the variable transmission polarization axis means are the same in either case of the display utilizing the eternal light and the display utilizing the light from the light source. Namely, when the transmission polarization axis of the variable transmission polarization axis means is in the first state, if the display due to the light being incident from the outside of the second polarized light separating means is bright, the display due to the light from the light source is also bright. When the transmission polarization axis of the variable transmission polarization axis means is in the second state, if the display due to light being incident from the outside of the second polarized light separating means is dark, the display due to the light from the light source is also dark. Therefore, there is no problem of the positive-negative reversal between the display due to light being incident from the outside of the second polarized light separating means and the display due to the light emitted from the light source.

In this embodiment, the optical element may comprise an optical element, which absorbs the light in the visible light region other than the predetermined wavelength region of light emitted from the first polarized light separating means, and is capable of partially reflecting the light in the predetermined wavelength region toward the first polarized light separating means and is also capable of partially transmitting the light in the predetermined wavelength region.

Further, in this case, the optical element may comprise a color filter. This construction enables color display according to the color of the color filter to be performed.

In this embodiment, the display device may further comprise reflection means arranged on the side opposite to the first polarized light separating means side with respect to the optical element so that at least light in the predetermined wavelength region can be reflected to the optical element.

Such reflection means can brighten the second or fourth display state due to the light emitted from the optical element.

According to the still further embodiment of the present invention, the display device further comprises an optical element arranged on the side opposite to the variable transmission polarization axis means side with respect to the first polarized light separating means so that the light in the visible light region out of the light in the visible light region is absorbed.

In this embodiment, the optical element may comprise a an light absorber in black color.

In this construction, in observation of the display device from the second polarized light separating means side, for the light which is incident between the first polarized light separating means and the second polarized light separating means from the light source, two display states namely, the fifth display state due to the light reflected by the first polarized light separating means and the sixth display state of black display are obtained depending on the conditions of the transmission polarization axis of the variable transmission polarization axis means. Since, the fifth display state is a display state due to the light reflected from the first polarized light separating means, bright display and high contrast to the sixth display state are obtained.

Also, for external light from the outside of the second polarized light separating means, two display states namely, the seventh display state due to the light reflected by the first polarized light separating means and the eighth display state of black display are obtained depending on the conditions of transmission polarization axis of the variable transmission polarization axis means. Since, the seventh display state is a display state due to the light reflected from the first polarized light separating means, bright display and high contrast to the eighth display state are obtained. Further, the display states, which are obtained depending on the conditions of transmission polarization axis of the variable transmission polarization axis means, are the same in either case of the display utilizing the light from the light source and in display utilizing external light, thereby causing no problem of the positive-negative reversal, which is aforementioned.

A display device in accordance with a further embodiment of the present invention further comprises a transmissive light diffusion layer provided between the first polarized light separating means and the variable transmission polarization axis means.

In this embodiment, display due to the light reflected from the first polarized light separating means is white. The light diffusion layer may be provided with a light guide function so as to be also used as a light guide plate which will be described below. Namely, in this case, the light diffusion layer has not only the function to diffuse light being incident from the upper side or lower side, but also the function to diffuse the light being incident from lateral sides to the vertical direction. Further, in this case, the quantity of light, which is emitted from the light diffusion layer to the first polarized light separating means side, is preferably larger than the quantity of light, which is emitted in the reverse direction. This is because the former contributes to the display contrast. The light diffusion layer may be arranged on one side or both sides of the light guide plate.

In this embodiment, the surface of the light diffusion layer may be an irregular surface or rough surface. This construction can relatively easily realize the light diffusion function.

Alternatively, in this embodiment, the light diffusion layer may contain particles having light diffusivity. This construction can relatively easily realize the light diffusion function.

In a display device in accordance with a further embodiment of the present invention, the light source means comprises a light source, and a transmissive light guide plate arranged between the second polarized light separating means and the variable transmission polarization axis means to guide the light from the light source to between the second polarized light separating means and the variable transmission polarization axis means, and emit the light at least to the variable transmission polarization axis means side.

In this embodiment, the light from the light source is guided by the light guide plate between the second polarized light separating means and the variable transmission polarization axis means, and emitted to at least the variable transmission polarization axis means side, and then reflected by the first polarized light separating means to be used for display. In this case, although it is also possible to make arrangement so as to make the light from the light source to be emitted to the second polarized light separating means side by the transmissive light guide plate, the light emitted to the variable transmission polarization axis means side contributes to the display contrast. The light being incident from the upper side or lower side of the light guide plate is transmitted through the transmissive light guide plate and thus does not interfere with the light used for display.

In this embodiment, the light source means may further comprise a light guide for guiding the light from the light source to the light guide plate. This construction increases freedom of the arrangement position of the light source, and further increases design freedom of the display device.

In this case, an end of the light guide may be located between the second polarized light separating means and the variable transmission polarization axis means, and the second polarized light separating means may be fixed to the light guide. This construction permits the light guide to be also used as a member for fixing the variable transmission polarization axis means and is thus advantageous.

Alternatively, in this case, the variable transmission polarization axis means may be fixed by the light guide. This construction permits the light guide to be also used as a member for fixing the variable transmission polarization axis means and is thus advantageous.

In the embodiment in which the light guide plate is provided between the second polarized light separating means and the variable transmission polarization axis means, the light guide plate may comprise a transmissive flat plate, and an irregular portion, which is formed on at least the variable transmission polarization axis means side of the flat plate and emits the light from the light source to the variable transmission polarization axis means side. This construction permits light emission through the uneven portion with relatively high efficiency.

In this case, the uneven portion may contain a plurality of projections discretely provided. This construction permits light emission through the sides of the plurality of projections with relatively high efficiency.

Furthermore, in this case, the projections may have a size of 5 to 300 $\mu$m. With a size of 5 $\mu$m or more, no influence of diffraction occurs, and with a size of 300 $\mu$m or less, the visual interference of the projections can be eliminated.

In the embodiment in which the light guide plate is provided between the second polarized light separating means and the variable transmission polarization axis means, the light guide plate may exhibit substantially optical isotropy. With a light guide plate exhibiting optical anisotropy, the display appearance is colored, thereby causing color irregularity. With the light guide plate exhibiting substantially optical isotropy, neither coloring of the display appearance nor color irregularity occurs.

Alternatively, in the embodiment in which the light guide plate is provided between the second polarized light separating means and the variable transmission polarization axis means, the light guide plate may be optically uniaxial or biaxial. With such an optically uniaxial or biaxial light guide plate having optical anisotropy with regularity, no color irregularity occurs, and thus it is possible to widen the viewing angle of display and improve the contrast.

In a display device in accordance with a further embodiment of the present invention, the light source means comprises a light source and a transmissive light guide plate arranged between the first polarized light separating means and the variable transmission polarization axis means, for guiding the light from the light source between the first polarized light separating means and the variable transmission polarization axis means, as well as emitting the light to at least the first polarized light separating means side.

In this embodiment, the light from the light source is guided by the transmissive light guide plate between the first polarized light separating means and the variable transmission polarization axis means and emitted to at least the first polarized light separating means side, and then reflected by the first polarized light separating means to be used for display. In this case, although the light from the light source may be emitted to the variable transmission polarization axis means side by the transmissive light guide plate, the light emitted to the first polarized light separating means side contributes to the display contrast. The light being incident from the upper side or lower side of the light guide plate is transmitted through the transmissive light guide plate and thus does not interfere with the light used for display.

In this embodiment, the light source means may further comprise a light guide for guiding the light from the light source to the light guide plate. This construction increases freedom of the arrangement position of the light source, and further increases design freedom of the display device.

In this case, an end of the light guide may be located on the second polarized light separating means, and the second polarized light separating means may be fixed to the light guide. This construction permits the light guide to be also used as a member for fixing the second polarized light separating means and is thus advantageous.

Alternatively, in this case, the variable transmission polarization axis means may be fixed by the light guide. This construction permits the light guide to be also used as a member for fixing the variable transmission polarization axis means and is thus advantageous.

In the embodiment comprising the light guide plate provided between the first polarized light separating means and the variable transmission polarization axis means, the light guide plate may comprise a transmissive flat plate and an uneven portion formed on at least the first polarized light separating means side of the flat plate, for emitting the light from the light source to the first polarized light separating means side.

In this case, the uneven portion may contain a plurality of projections discretely provided.

Furthermore, in this case, the projections may have a size of 5 to 300 $\mu$m.

In the embodiment comprising the light guide plate provided between the first polarized light separating means and the variable transmission polarization axis means, the light guide plate may exhibit substantially optical isotropy.

Alternatively, in the embodiment comprising the light guide plate provided between the first polarized light separating means and the variable transmission polarization axis means, the light guide plate may be optically uniaxial or biaxial.

In the embodiment comprising the light guide plate provided between the first polarized light separating means and the variable transmission polarization axis means, the first polarized light separating means may be adhered to the light guide plate with an adhesive.

In this case, the adhesive may also constitute the transmissive light diffusion layer. This construction permits the realization of a thin display device, and a decrease in the number of the parts.

In a display device in accordance with a further embodiment of the present invention, the variable transmission polarization axis means comprises a liquid crystal. Namely, the display device is constructed as a liquid crystal display.

In this case, the liquid crystal may be a TN liquid crystal, a STN liquid crystal, or a ECB liquid crystal. This construction enables high-quality bright image display to be realized relatively easily without positive-negative reversal between reflective display and transmissive display.

The object of the present invention can also be achieved by an electronic apparatus comprising the above-described display device of the present invention.

Since the electronic apparatus of the present invention comprises the display device of the above mentioned present invention, various electronic apparatus capable of displaying high-quality bright images can be realized.

The object of the present invention can also be achieved by a display device comprising a variable transmission polarization axis optical element; a first polarized light separator of a type in which polarized light separation is performed by reflection, and which is arranged on the one side of the variable transmission polarization axis optical element; a second polarized light separator of a type in which polarized light separation is performed by reflection or absorption, and which is arranged on the other side of the variable transmission polarization axis optical element; and a light source for making light incident from between the first and second polarized light separators.

In this display device, the first polarized light separator transmits a linearly-polarized light component which is in a first direction and emitted from the side of the variable transmission polarization axis optical element and reflects a linearly-polarized light component which is different from the first linearly-polarized light component, thereby separation of polarized light is performed. Therefore, the display device can obtain brighter display by utilizing the reflected linearly-polarized light component, as compared with a conventional display device using a polarizer for separating polarized light by absorption. Furthermore, in this display device, since light is incident between the first and second polarized light separators from the light source, the light is incident from the upper side of the first polarized light separator, thereby causing no positive-negative reversal. Also, freedom of the arrangement position of the light source, and design freedom of the display device are increased.

BRIEF DESCRIPTION OF THE DRAWINGS

FIGS. 18(a), (b) and (c) are sectional views respectively showing examples of a light diffusion layer provided in the liquid crystal display device in accordance with the eighth embodiment of the present invention;

FIGS. 19(a), (b) and (c) are sectional views respectively showing examples of projections formed on the light diffusion layer provided in the liquid crystal display device in accordance with the eighth embodiment of the present invention;

DETAILED DESCRIPTION OF THE PREFERRED EMBODIMENTS

The best mode for carrying out the present invention is described for each embodiment with respect to the drawings.

First Embodiment

Figure 1:
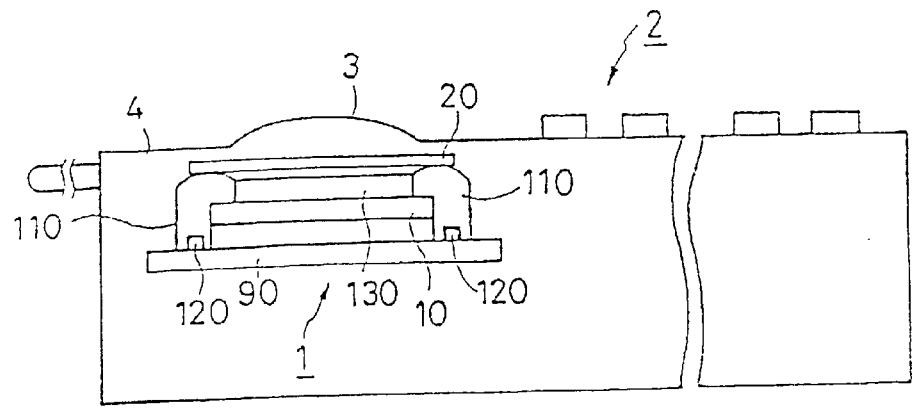
FIG. 1 is a schematic sectional view illustrating a liquid crystal display device and a portable telephone in accordance with a first embodiment of the present invention.
Figure 2:
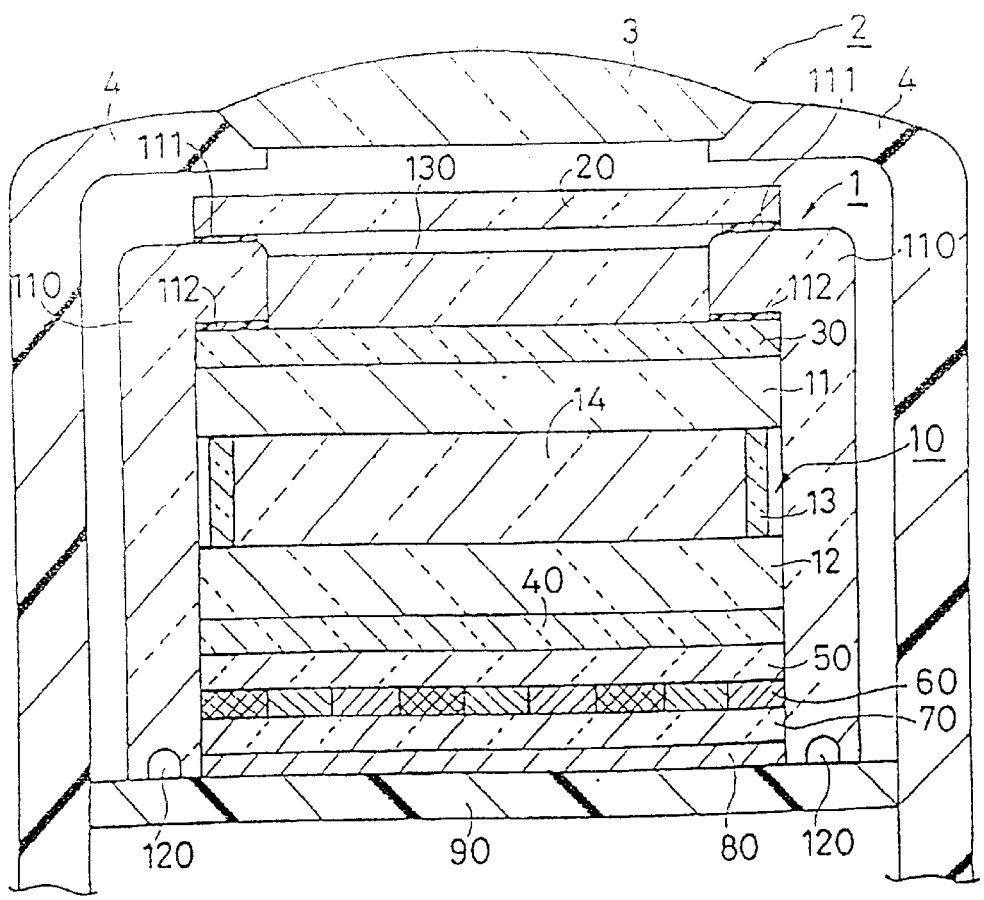
FIG. 2 is a schematic sectional view illustrating the liquid crystal display device and the portable telephone in accordance with a first embodiment of the present invention.

FIG. 1 is a schematic sectional view illustrating a liquid crystal display device and a portable telephone in accordance with a first embodiment of the present invention, and FIG. 2 is a schematic sectional view illustrating the liquid crystal display device and the portable telephone in accordance with the first embodiment of the present invention.

As shown in FIG. 1, a portable telephone 2 of this embodiment comprises a liquid crystal device 1 provided in a portable telephone body case 4 comprising a transparent cover 3 so that the display on the liquid crystal display device 1 can be observed from the outside through the transparent cover 3.

As shown in FIG. 2, in the liquid crystal display device 1 of this embodiment, a liquid crystal cell 10 having a STN liquid crystal or the like is used as an example of a variable transmission polarization axis optical element. A retardation film 30 is provided at the upper side of the liquid crystal cell 10. Under the liquid crystal cell 10, a diffuser 40, a lower polarized light separator 50 as first polarized light separating means, a color filter 60, a PET (polyethylene terephthalate) film 70, and an Al (aluminum) deposited film 80 formed on surface of the PET film 70 are provided in this order.

In the liquid crystal cell 10, a STN liquid crystal or the like is sealed in a cell comprising two glass substrates 11 and 12 and a sealing member 13.

A PCB substrate 90 is mounted on the portable telephone body case 4. On the PCB substrate 90, a structure comprising the Al deposited film 80, the PET film 70, the color filter 60, the lower polarized light separator 50, the diffuser 40, the liquid crystal cell 10 and the retardation film 30 is provided. On the PCT substrate 90, which is on both sides of the above mentioned structure is, a LED 120 for emitting light upward.

On the both sides of the above mentioned structure, a light guide 110 is provided. The light guides 110 are used for laterally positioning the liquid crystal cell 10, and fixing the structure comprising the liquid crystal cell 10, etc. The lower ends of the light guides 110 are designed so that the light from the LEDs 120 is introduced therein. The light guides 110 extend upward, and the upper ends thereof on the retardation film 30 are bent to the inside of the retardation film 30. The lower side of the upper end of each of the light guides 110 is fixed to the retardation film 30 with a double side tape 112. On the upper sides of the upper ends of the light guides 110, an upper polarized light separator 20 as second polarized light separating means is provided, and the upper side of the upper end of each of the light guides 110 is fixed to the upper polarized light separator 20 by a double side tape 111.

On the retardation film 30, a light guide plate 130 is provided between both light guides 10. Each of the light guides 110 comprises an optically isotropic acrylic resin. The light from the LEDs 120 is guided to between the upper polarized light separator 20 and the retardation film 30 by the light guides 110, then introduced into the light guide plate 30 from the upper ends of the light guides 30, and emitted toward the retardation film 30 side. On the other hand, the light guide plate 130 transmits light from the upper polarized light separator 20 toward the retardation film 30 side, and transmits light from the retardation film 30 toward the upper polarized light separator 20 side.

Description will be made, as a example, on the upper polarized light separator 20 and the lower polarized light separator 50 used in the liquid crystal display device 1 of this embodiment with reference to FIG. 3.

The lower polarized light separator 50 comprises a structure in which two different layers 51 (A layer) and 52 (B layer) are alternately laminated in a plurality of layers. In the A layer 51, the refractive index (nAX) in the X direction is different from the refractive index (nAY) in the Y direction. While, in the B layer 52, the refractive index (nBX) in the X direction is the same as the refractive index (nBY) in the Y direction. Also the refractive index (nAY) of the A layers 51 in the Y direction is the same as the refractive index (nBY) of the B layers 51 in the Y direction.

Therefore, out of the light being incident on the lower polarized light separator 50 from a direction perpendicular to the upper side 55 thereof, linearly-polarized light in the Y direction is transmitted through the lower polarized light separator 50, and emitted as linearly-polarized light in the Y direction from the lower side 56 thereof. Conversely, out of the light being incident on the lower polarized light separator 50 from a direction perpendicular to the lower side 56 thereof, linearly-polarized light in the Y direction is transmitted through the lower polarized light separator 50, and emitted from the upper side 56 as linearly-polarized light in the Y direction.

On the other hand, if the thickness of the A layers 51 in the Z direction is tA, the thickness of the B layers 52 in the Z direction is tB, and the wavelength of incident light is $\mu$, the following equation is established;

$$tA \cdot nAX + tB \cdot nBX = \mu/2 \quad (1)$$

In this case, out of the light having wavelength $\mu$ and being incident on the lower polarized light separator 50 from a direction perpendicular to the upper side 55 thereof, linearly-polarized light in the X direction is reflected as linearly-polarized light in the X direction by the lower polarized light separator 50. While, out of the light having wavelength k and being incident on the lower polarized light separator 50 from a direction perpendicular to the lower side 56 thereof, linearly-polarized light in the X direction is reflected as linearly-polarized light in the X direction by the lower polarized light separator 50.

The thickness tA of the A layers 51 in the Z direction and the thickness tB of the B layers 52 in the Z direction are changed to various values so that the equation (1) is established over the entire wavelength range of visible light. Thereby, it is possible to obtain a polarized light separator in which not only for monochromatic light but also for over the entire region of white light, linearly-polarized light in the X direction is reflected as linearly-polarized light in the X direction, and linearly-polarized light in the Y direction is transmitted as linearly-polarized light in the Y direction.

Although the above description relates to the lower polarized light separator 50 as an example, the upper polarized light separator 20 has the same structure.

As a example of material used for the A layers 51, polyethylene naphthalate (PEN) having birefringence and stretched five times can be used, and as an example of material used for the B layers 52 is copolyester of naphthalene dicarboxylic acid and terephthalic or isothalic acid (coPEN). In this case, the refractive index (nAX) of the A layers 51 in the X direction is 1.88, the refractive index (nAY) of the same in Y direction is 1.64, and both the refractive index (nBX) of the B layers 52 in the X direction and the refractive index (nBY) thereof in the Y direction are 1.64.

Such a polarized light separator is disclosed as a reflective polarizer in the Published Japanese Translations of PCT International Publication for Patent applications No. 9-506985 (International Publication No. WO/95/17692) and International Publication No. WO/95/27819. In this embodiment, the reflective polarizer disclosed in these publications can be used.

Figure 4:
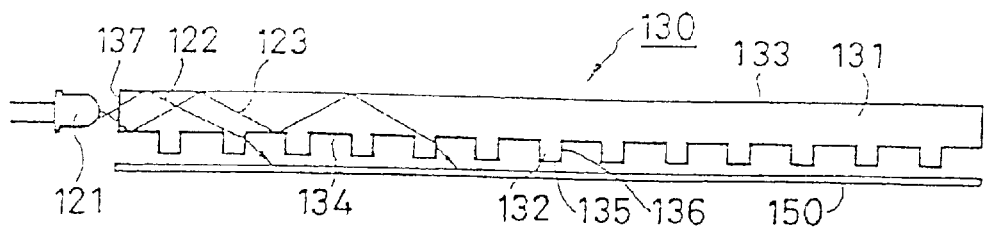
FIG. 4 is a schematic sectional view illustrating a light guide plate used in the liquid crystal display device in accordance with the first embodiment of the present invention.
Figure 5:
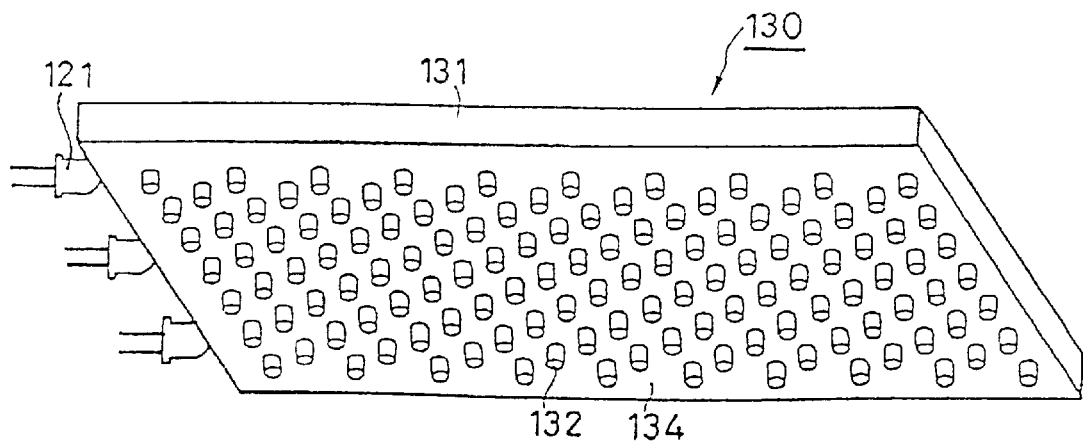
FIG. 5 is a schematic sectional view illustrating the light guide plate used in the liquid crystal display device in accordance with the first embodiment of the present invention.

Description will now be made of the light guide plate 130 used in the liquid crystal display device 1 of this embodiment with reference to FIGS. 4 and 5. FIG. 4 is a schematic sectional view, and FIG. 5 is a schematic perspective view.

The light guide plate 130 comprises projections 132 provided on one side (emission surface) 134 of a transparent flat plate 131. Each of the projections 132 is cylindrical, and comprises a surface (the bottom 135) substantially parallel to the emission surface 134, and a substantially vertical surface (the side 136). The light guide 130 is made of a transparent material having a refractive index of about 1.4 or more. As shown by light rays 122 and 123, the light flux from the LED 121 is incident from the end surface 137, then repeatedly totally reflected in the light guide plate 130 and emitted only from the sides 136 of the projections 132, thereby effectively illuminating an object 150 to be illuminated.

In this way, the light guide plate 130 effectively emits the light, which is incident on the end surface 137 thereof, from the emission surface 134. On the other hand, the light guide plate 130 transmits light from the surface 133 thereof to the surface 134, and transmits light from the surface 134 to the surface 133 thereof.

Examples of transparent materials preferably used for forming the light guide plate 130 include transparent resins such as acrylic resins, polycarbonate resins, non-crystal polyolefin resins, and the like; inorganic transparent materials such as glass and the like; and composite materials thereof. In this embodiment, an optically isotropic acrylic resin is used. The thickness is 0.3 to 2 mm. Since the wavelength of visible light is about 380 nm to 700 nm, the projections must have a size 5 $\mu$m or more in order to prevent the occurrence of influences of diffraction. In order that the projections 132 have a size causing no visual interference, the size is preferably about 300 μm or less. In consideration of the convenience of production, the size of the projections 132 is preferably about 10 μm to 100 μm. The ratio of the height to the width (in the case of a substantial cylinder, the diameter) of the projections 132 may be 1:1 because the angle of incidence of light in the planer direction in the light guide plate 130 is 45 degrees or less. Since actually the ratio of the light rays at 20 degrees or less is 90% or more, sufficient performance is exhibited at a height to width ratio up to 1:2. In this embodiment, the projections 132 have a diameter of 20 μm, a height of 15 μm and a pitch of 20 μm.

The retardation film 30 is used as an optically anisotropic material for color compensation, for compensating for the color generated in the liquid crystal 14 such as a STN liquid crystal or the like.

The Al deposited film 80 provided on the back of the PET film 70 functions as reflection means, brightening the color display utilizing the color filter 60.

The operation of the liquid crystal display device 1 of the present invention is described with reference to FIGS. 6 and 7.

Although this embodiment uses a STN liquid crystal or the like as the liquid crystal 14, description is made of a case as an example in which a TN liquid crystal is used as the liquid crystal 14 for the sake of simplicity.

Figure 6:
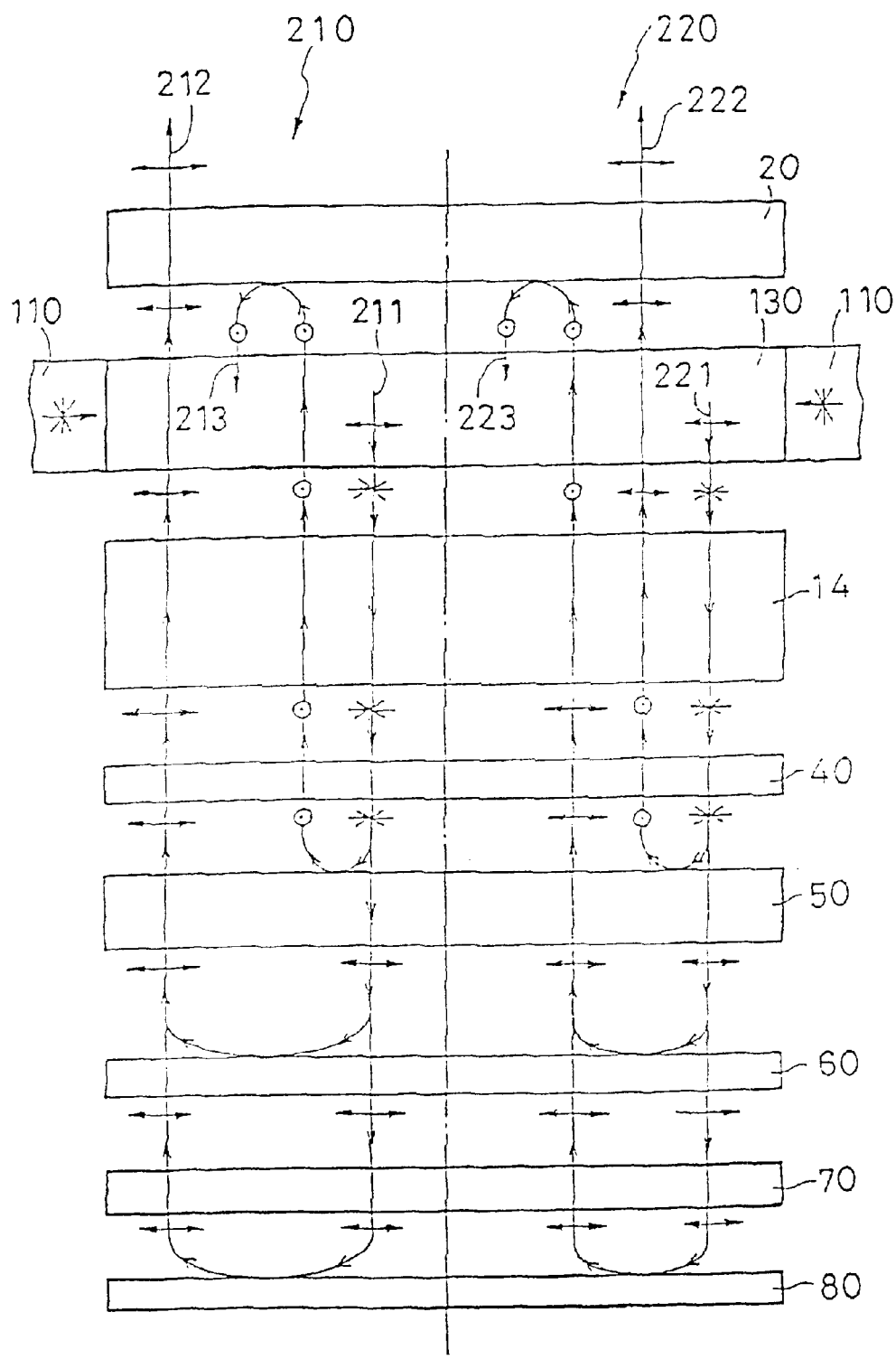
FIG. 6 is a schematic sectional view illustrating the operation of the liquid crystal display device in accordance with the first embodiment of the present invention.
Figure 7:
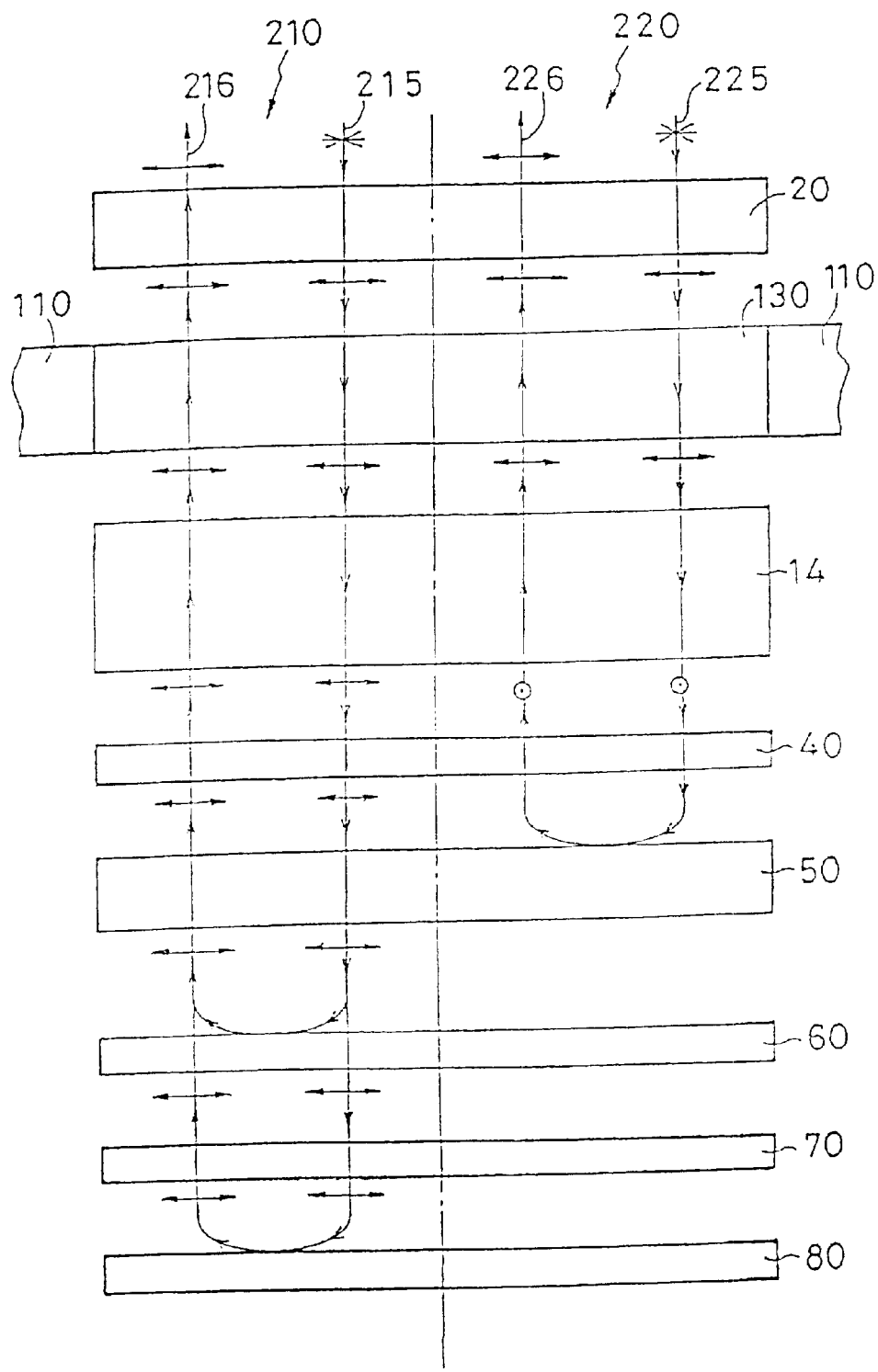
FIG. 7 is a schematic sectional view illustrating the operation of the liquid crystal display device in accordance with the first embodiment of the present invention.

FIG. 6 shows the case of transmissive display, i.e., the case in which light from the LED 120 (refer to FIG. 2) is incident on the light guide plate 130 through the light guide 110. It is assumed that the left side is a voltage applied portion 210, and the right side is a voltage unapplied portion 220.

Considering the light emitted from the light guides 110 and reaching the upper polarized light separator 20, linearly-polarized component light parallel to the drawing is transmitted as linearly-polarized component light parallel to the drawing through the upper polarized light separator 20 to the observation side. On the other hand, linearly-polarized component light in the direction perpendicular to the drawing is reflected as linearly-polarized component light in the direction perpendicular to the drawing by the upper polarized light separator 20, and travels to the inside of the liquid crystal display element. Since there are various interfaces having discontinuous refractive indexes in the liquid crystal display element, the linearly-polarized light in the direction perpendicular to the drawing is reflected by the interfaces having discontinuous refractive indexes. Then the light is repeatedly reflected in the liquid crystal display element, and emitted to the observation side through the upper polarized light separator 20. Therefore, brighter display can be obtained when the light from the light guide 110 is used for display comparing a case in which a polarizer is used as the upper polarized light separator. Of course, even when a polarizer is used as the upper polarized light separator 20, the reflective polarizer is used as the lower polarized light separator 50, thereby obtaining brighter display than conventional display.

Description will now be made of the display caused by the light emitted from the light guides 110 being transmitted through the TN liquid crystal 14 or the like.

In the voltage unapplied portion 220 on the right side, natural light 221 from the light guide 110 is transmitted through the TN liquid crystal 14 and the diffusion layer 40. Out of the natural light transmitted through the TN liquid crystal 14 and the diffusion layer 40, linearly-polarized light in the direction perpendicular to the drawing is reflected as linearly-polarized light in the direction perpendicular to the drawing by the lower polarized light separator 50, and then the polarization direction is twisted for 90° by the TN liquid crystal 14 to produce linearly-polarized light parallel to the drawing. The linearly-polarized light parallel to the drawing emitted from the TN liquid crystal 14 is transmitted through the light guide plate 130, and transmitted as linearly-polarized light parallel to the drawing through the upper polarized light separator 20 to produce outgoing light 222 traveling to the observation side.

Out of the light transmitted through the TN liquid crystal 14 and the diffusion layer 40, linearly-polarized light parallel to the drawing is transmitted as linearly-polarized light parallel to the drawing through the lower polarized light separator 50. Part of the linearly-polarized light parallel to the drawing transmitted through the lower polarized light separator 50 is reflected by the color filter 60, then transmitted as linearly-polarized light parallel to the drawing through the lower polarized light separator 50, and then transmitted through the diffusion layer 40, and then the polarization direction is twisted for 90° by the TN liquid crystal 14 to produce linearly-polarized light in the direction perpendicular to the drawing. The linearly-polarized light in the direction perpendicular to the drawing which leaves the TN liquid crystal 14 is transmitted through the light guide plate 130, and reflected as linearly-polarized component light in the direction perpendicular to the drawing by the upper polarized light separator 20 to produce reflected light 223 traveling toward the inside of the liquid crystal display element. Another part of the linearly-polarized light parallel to the drawing transmitted through the lower polarized light separator 50 is transmitted through the color filter 60 while being absorbed thereby, reflected by the Al deposited film 80 provided on the back of the PET film 70, and again transmitted through the color filter 60 while being absorbed thereby, then transmitted as linearly-polarized light parallel to the drawing through the lower polarized light separator 50, and transmitted through the diffusion layer 40, and then the polarization direction is twisted for 90° by the TN liquid crystal 14 to produce linearly-polarized light in the direction perpendicular to the drawing. The linearly-polarized light in the direction perpendicular to the drawing which leaves the TN liquid crystal 14 is transmitted through the light guide plate 130, and reflected as linearly-polarized component light in the direction perpendicular to the drawing by the upper polarized light separator 20 to produce reflected light 223 traveling toward the inside of the liquid crystal display element.

In this way, when no voltage is applied, the light from the light guide 110 is reflected by the lower polarized light separator 50, and emitted as the outgoing light 222 to obtain bright display. Since the diffusion layer 40 is provided between the lower polarized light separator 50 and the TN liquid crystal 14, the light reflected from the lower polarized light separator 50 is changed from a mirror state to a white state.

In the voltage applied portion 210 on the left side, light 211 from the light guide 110 is transmitted through the TN liquid crystal 14 and the diffusion layer 40. Out of the natural light transmitted through the TN liquid crystal 14 and the diffusion layer 40, linearly-polarized light in the direction perpendicular to the drawing is reflected as linearly-polarized light in the direction perpendicular to the drawing by the lower polarized light separator 50, and transmitted through the TN liquid crystal 14 without a change in the polarization direction. The linearly-polarized light in the direction perpendicular to the drawing transmitted through the TN liquid crystal 14 is transmitted through the light guide plate 130, and reflected as linearly-polarized light in the direction perpendicular to the drawing by the upper polarized light separator 20 to produce reflected light 213 traveling toward the inside of the liquid crystal display element.

Out of the light transmitted through the TN liquid crystal 14 and the diffusion layer 40, linearly-polarized light parallel to the drawing is transmitted as linearly-polarized light parallel to the drawing through the lower polarized light separator 50. Part of the linearly-polarized light parallel to the drawing transmitted through the lower polarized light separator 50 is reflected by the color filter 60, then transmitted through as linearly-polarized light parallel to the drawing through the lower polarized light separator 50, and then transmitted through the diffusion layer 40, and then transmitted through the TN liquid crystal 14 without a change in the polarization direction. The linearly-polarized light parallel to the drawing transmitted through the TN liquid crystal 14 is transmitted through the light guide plate 130, and transmitted as linearly-polarized light parallel to the drawing through the upper polarized light separator 20 to produce outgoing light 212 traveling toward the observation side. Another part of the linearly-polarized light parallel to the drawing transmitted through the lower polarized light separator 50 is transmitted through the color filter 60 while being absorbed thereby, reflected by the Al deposited film 80 provided on the back of the PET film 70, and then again transmitted through the color filter 60 while being absorbed thereby, then transmitted as linearly-polarized light parallel to the drawing through the lower polarized light separator 50, transmitted through the diffusion layer 40, and then transmitted through the TN liquid crystal 14 without a change in the polarization direction. The linearly-polarized light parallel to the drawing transmitted through the TN liquid crystal 14 is transmitted through the light guide plate 130, and transmitted as linearly-polarized light parallel to the drawing through the upper polarized light separator 20 to produce outgoing light 212 traveling to the observation side.

Description will now be made of the case of reflective display, i.e., a case in which external light is incident on the liquid crystal display device 1, with reference to FIG. 7.

In the voltage unapplied portion 220 on the right side, when natural light 225 as external light is incident on the liquid crystal display device 1, the natural light 225 is changed to linearly-polarize light parallel to the drawing by the upper polarized light separator 20, and then transmitted as linearly-polarized light parallel to the drawing through the light guide 130, and then the polarization direction is twisted for 90° by the TN liquid crystal 14 to produce linearly-polarized light in the direction perpendicular to the drawing, which is transmitted through the diffusion layer 40. The linearly-polarized light in the direction perpendicular to the drawing transmitted through the diffusion layer 40 is reflected as linearly-polarized light perpendicular to the drawing by the lower polarized light separator 50, and then the polarization direction is twisted for 90° by the TN liquid crystal 14 to produce linearly-polarized light parallel to the drawing. The linearly-polarized light parallel to the drawing, which leaves the TN liquid crystal 14, is transmitted through the light guide plate 130, and transmitted as linearly-polarized light parallel to the drawing through the upper polarized light separator 20 to produce outgoing light 226 traveling toward the observation side.

In this way, during the time with no voltage applied, the natural light 225 as external light is reflected by the lower polarized light separator 50, and emitted as the outgoing light 226, thereby obtaining bright display. Since the diffusion layer 40 is provided between the lower polarized light separator 50 and the TN liquid crystal 14, the light reflected from the lower polarized light separator 50 is changed from a mirror state to a white state.

In the voltage applied portion 210 on the left side, when natural light 215 as external light is incident on the liquid crystal display device 1, the natural light 215 is changed to linearly-polarized light parallel to the drawing by the upper polarized light separator 20, and then transmitted through the light guide 130, the TN liquid crystal 14 and the diffusion layer 40 without a change in the polarization direction. The linearly-polarized light parallel to the drawing transmitted through the diffusion layer 40 is transmitted as linearly-polarized light parallel to the drawing through the lower polarized light separator 50. Part of the linearly-polarized light parallel to the drawing transmitted through the lower polarized light separator 50 is reflected by the color filter 60, then transmitted as linearly-polarized light parallel to the drawing through the lower polarized light separator 50, and then transmitted through the diffusion layer 40 and the TN liquid crystal 14 without a change in the polarization direction. The linearly-polarized light parallel to the drawing transmitted through the TN liquid crystal is transmitted through the light guide plate 130, and then transmitted as linearly-polarized light parallel to the drawing through the upper polarized light separator 20 to produce outgoing light 216 traveling toward the observation side. Another part of the linearly-polarized light parallel to the drawing transmitted through the lower polarized light separator 50 is transmitted through the color filter 60 while being absorbed thereby, reflected by the Al deposition film 80 provided at the rear side of the PET film 70, then transmitted again through the color filter 60 while being absorbed thereby, then transmitted as linearly-polarized light parallel to the drawing through the lower polarized light separator 50, then transmitted through the diffusion layer 40 and then transmitted through the TN liquid crystal 14 without a change in the polarization direction. The linearly-polarized light parallel to the drawing transmitted through the TN liquid crystal 14 is transmitted through the light guide plate 130, and transmitted as linearly-polarized light parallel to the drawing through the upper polarized light separator 20 to produce outgoing light 216 traveling toward the observation side.

As described above, in the first embodiment, in the voltage unapplied portion 220 on the right side, the natural light 221 from the light guide 110 is reflected to the outside (upward in FIG. 6) of the liquid crystal display device by the lower polarized light separator 50, transmitted through the upper polarized light separator 20 and emitted as outgoing light 222 from the upper polarized light separator 20 (refer to FIG. 6). The natural light 225 as external light is reflected to the outside (upward in FIG. 7) of the liquid crystal display device by the lower polarized light separator 50, transmitted through the upper polarized light separator 20 and emitted as outgoing light 226 from the upper polarized light separator 20 (refer to FIG. 7). In both cases, the natural light is changed from a mirror state to a white state by the diffusion layer 40 and then emitted to the observation side from the upper polarized light separator 20. On the other hand, in the voltage applied portion 210 on the left side, the natural light 211 from the light guide 110 is transmitted through the lower polarized light separator 50, colored by the color filter 60, again transmitted through the lower polarized light separator 50, transmitted through the upper polarized light separator 20 and emitted as outgoing light 212 from the upper polarized light separator 20 (refer to FIG. 6). The natural light 215 as external light is transmitted through the upper polarized light separator 20 and the lower polarized light separator 50, colored by the color filter 60, again transmitted through the lower polarized light separator 50 and the upper polarized light separator 20, and emitted as outgoing light 216 from the upper polarized light separator 20 (refer to FIG. 7). In both cases, the natural light is colored by the color filter 60 and then emitted to the observer side from the upper polarized light separator 20. Therefore, the display states obtained in display due to external light in accordance with the on-off state of the TN liquid crystal 14 are the same as display due to light from the light guides 110, thereby causing no problem of the positive-negative reversal between the display due to external light and the display due to light (light from the LED 120) from the light guide 110.

With no voltage applied, the light 221 from the light guide 110 is reflected by the lower polarized light separator 50 and emitted as the outgoing light 222 (refer to FIG. 6), and the natural light 225 as external light is also reflected by the polarized light separator 50 and emitted as the outgoing light 226 (refer to FIG. 7), thereby obtaining bright display. Since the diffusion layer 40 is provided between the lower polarized light separator 50 and the TN liquid crystal 14, the light reflected from the lower polarized light separator 50 is changed from a mirror state to a white state.

As described above, in the voltage unapplied portion 220, the light reflected by the lower polarized light separator 50 is scattered by the diffusion layer 40 to produce the white outgoing light 222 (refer to FIG. 6) or 226 (refer to FIG. 7), and in the voltage applied portion 110, the light transmitted through the lower polarized light 50 is colored by the color filter 60 to produce the color outgoing light 212 (refer to FIG. 6) or 216 (refer to FIG. 7), thereby obtaining color display on a white background. However, in the use of black as a color of the color filter 60, light at all wavelengths in the visible light region is absorbed thereby obtaining black display on a white background.

Since the Al deposited film 80 is provided as a reflector, the color outgoing light 212 or 216 colored by the color filter 60 is brightened.

The transmission axis of the lower polarized light separator 50 may be rotated for 90° to reverse the display state of the voltage applied portion and the same of the voltage unapplied portion. Namely, negative display can be obtained under either external light when the light source is turned on.

In this embodiment, as shown in FIG. 2, the light guide plate 130 is arranged between the upper polarized light separator 20 and the retardation film 30. This construction has the advantage that clouding and blurring due to the projections 132 are hardly seen at a low viewing angle, as compared with a display device of a type in which the light guide plate 130 is arranged on the upper polarized light separator 20.

Although the above description relates to the TN liquid crystal as an example for the sake of simplicity, if a STN liquid crystal, a ECB (Electrically Controlled Birefringence) liquid crystal or the light, which can change the transmission polarization axis by means of a voltage or the like, is used in place of the TN liquid crystal, the basic operation principle is the same.

Second Embodiment

Figure 8:
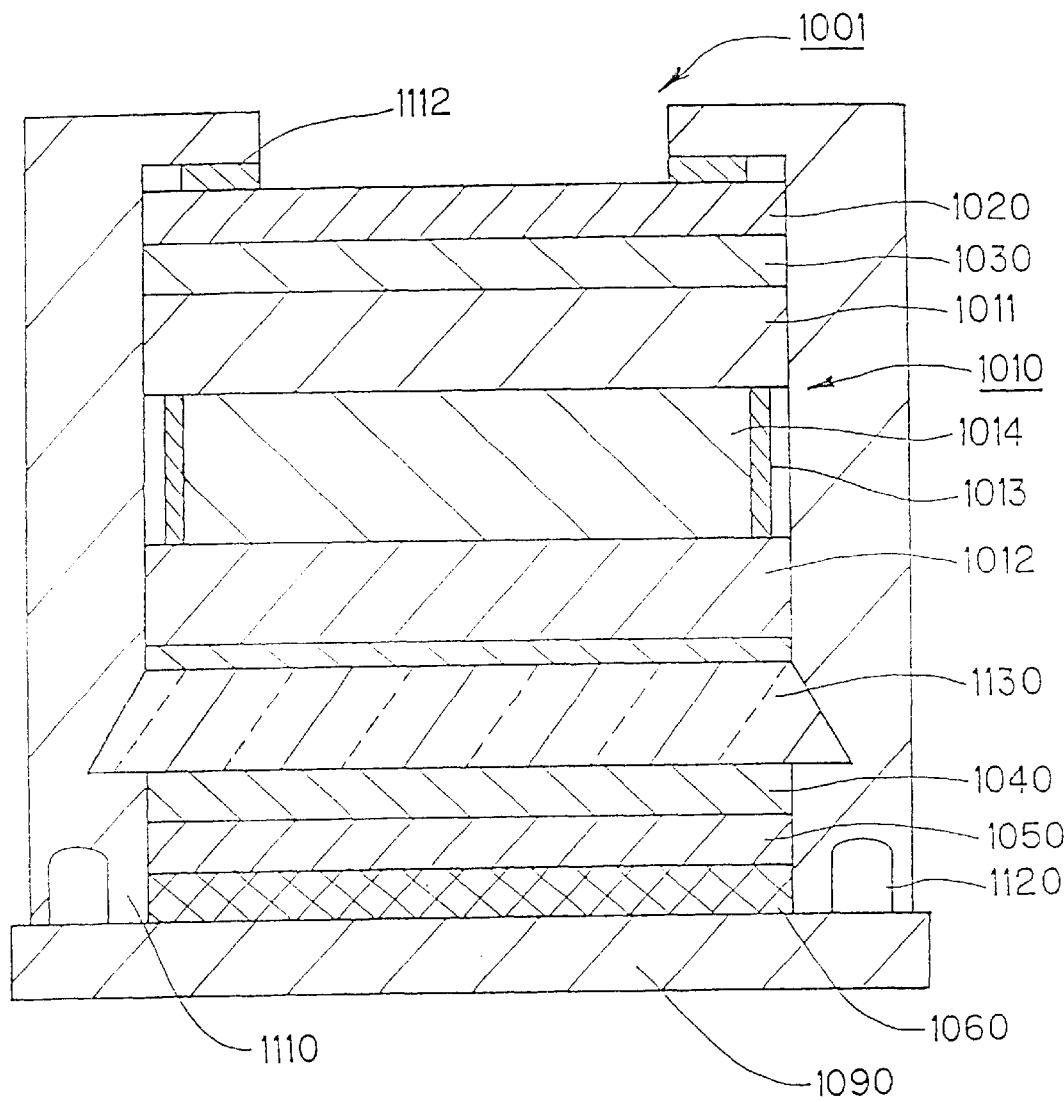
FIG. 8 is a schematic sectional view illustrating a liquid crystal display device in accordance with a second embodiment of the present invention.

FIG. 8 is a schematic sectional view illustrating a liquid crystal display device in accordance with a second embodiment of the present invention.

As shown in FIG. 8, in a liquid crystal display device 1001 of this embodiment, a liquid crystal cell 1010 comprising a STN liquid crystal is used as a variable transmission polarization axis optical element. On the liquid crystal cell 1010, a retardation film 1030 and an upper polarizer 1020 as an example of the second polarized light separating means are provided in this order. While, under the liquid crystal cell 1010, a light guide plate 1130, a diffuser-containing adhesive 1040, a lower polarized light separator 1050 as an example of the first polarized light separating means, and a light absorber in black color 1060 are provided in this order. The diffuser-containing adhesive 1040 has both the light diffusing function and the adhesive function, and can be adhered to the light guide plate 130.

In the liquid crystal cell 1010, a STN liquid crystal 1014 is sealed in a cell comprising two glass substrates 1011 and 1012 and a sealing member 1013. The product $\Delta n \times d$ of the optical anisotropy $\Delta n$ of the liquid crystal 1014 of the liquid crystal cell 1010 and the thickness d of the liquid crystal layer thereof is set to 1100 nm or more. By applying at least three different values of effective voltages to the liquid crystal cell 1010, as in gray scale driving without a frame, multicolor display of at least three colors is possible in accordance with the applied effective voltages. The use of a retardation film 1030 permits compensation for the color generated in the liquid crystal 104 and multicolor display including white display.

On a PCB substrate 1090, LEDs 1120 are provided so that light is emitted upward from the LEDs 1120. Also light guides 1110 are provided on the PCB substrate 1090 in order to introduce the light from the LEDs 1120. The light guides 1110 are used for laterally positioning the liquid crystal cell 1010, and fixing the structure comprising the liquid crystal cell 1010, etc. The light guides 110 extend upward and hold a light guide plate 1130 therebetween at intermediate positions, for further introducing the light introduced from the LEDs 1120 to the light guide plate 1130. Besides, the upper end of each of the light guides 1110 is bent toward the inside of the upper polarizer 1020. The lower side of the upper end of each of the light guides 1110 is fixed to the upper polarizer 1020 with a double side tape 1112. Each of the light guides 1110 may comprise a transparent plastic plate, or a cavity surrounded by an opaque plastic plate having a reflecting function. Also the light guides 1110 and the light guide plate 1130 may be formed either by combining both of the parts or by integral molding.

The light from the LEDs 1120 is guided into the light guide plate 1130 by the light guides 1100. The light guide plate 1130 has an irregular surface or rough surface formed on the lower polarized light separator 1050 side (lower surface) so that light is transmitted toward the lower polarized light separator 1050 side. Therefore, the light from the light guides 1110 is emitted toward the lower polarized light separator 1050 side. On the other hand, the light guide plate 1130 transmits light from the liquid crystal cell 1010 toward the lower polarized light separator 1050 side, and transmits light from the lower polarized light separator 1050 toward the liquid crystal cell 1010 side.

Figure 3:
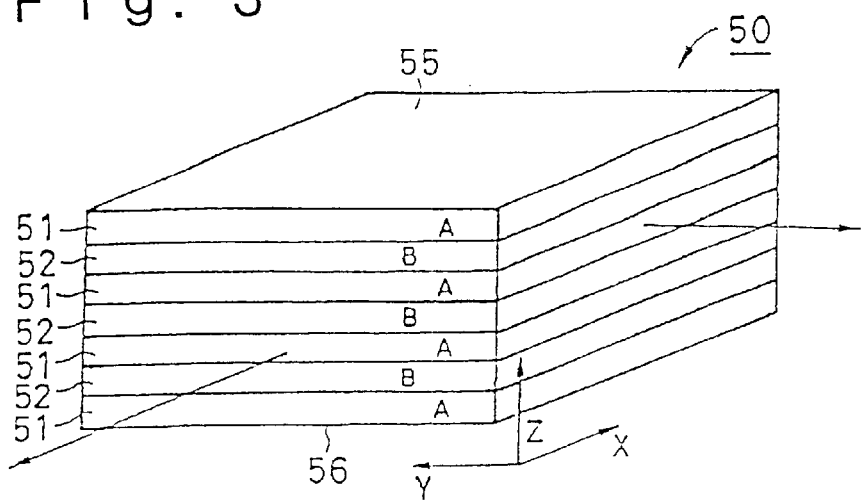
FIG. 3 is a schematic sectional view illustrating a polarized light separator (reflective polarizer) used in the liquid crystal display device in accordance with the first embodiment of the present invention.

The lower polarized light separator 1050 has the same structure as FIG. 3.

Figure 9:
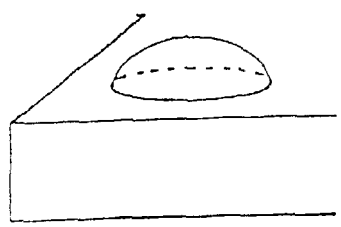
FIGS. 9(a), (b), (c) and (d) are drawings respectively showing the shapes of the surface of the light guide plate of the liquid crystal display device in accordance with the second embodiment of the present invention.
Figure 9:
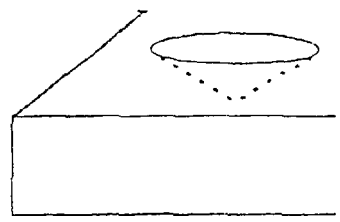
Figure 9:
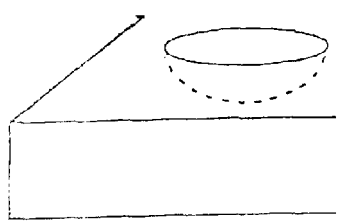
Figure 9:
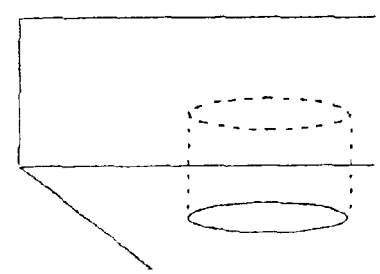

The light guide 1130 may have the same structure as FIGS. 4 and 5. Alternatively, the light guide plate 1130 may have appropriate shapes of irregularities such as a substantially semispherical convex shape as shown in FIG. 9(a), a conical concave shape as shown in FIG. 9(b), a substantially semispherical concave shape as shown in FIG. 9(c), a cylindrical concave shape as shown in FIG. 9(d), or the like. Furthermore, the density distribution of irregularities of convex shape and concave shape may be changed in the plane so that the surface luminance of the light guide plate 1130 is uniform. The light guide plate may be bonded to a plastic or glass substrate or the like whose surface has one of the above shapes. In this case, it is preferable that the refractive index of a film with the surface having one of the above shapes is substantially the same as the refractive index of the plastic or glass substrate. As mentioned above, the light guide 1130 has irregularities formed in the surface thereof and thus functions as a light diffuser.

Figure 10:
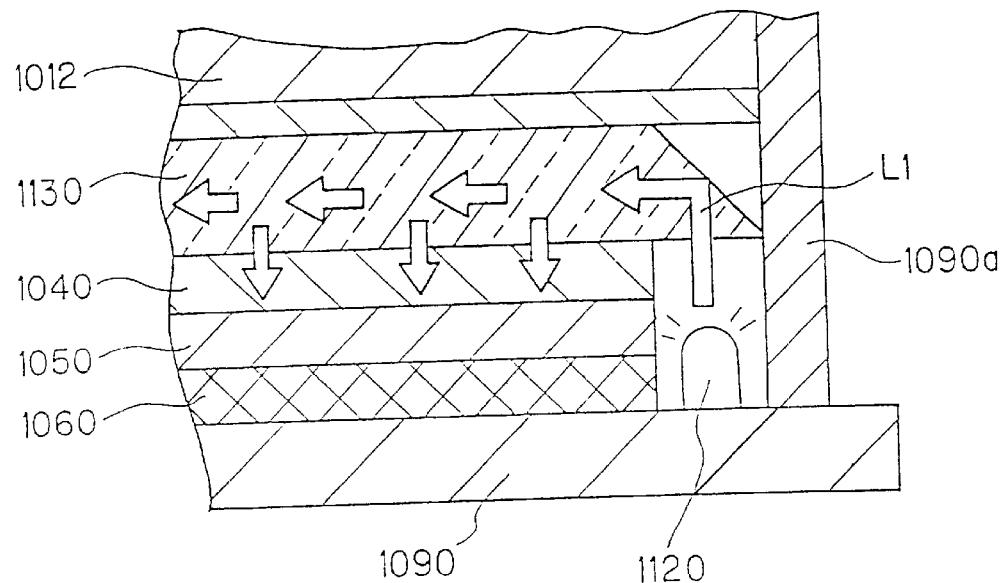
FIG. 10 is an enlarged sectional view showing a portion where light is incident on the light guide plate from a LED in a modified embodiment of the second embodiment of the present invention.
Figure 11:
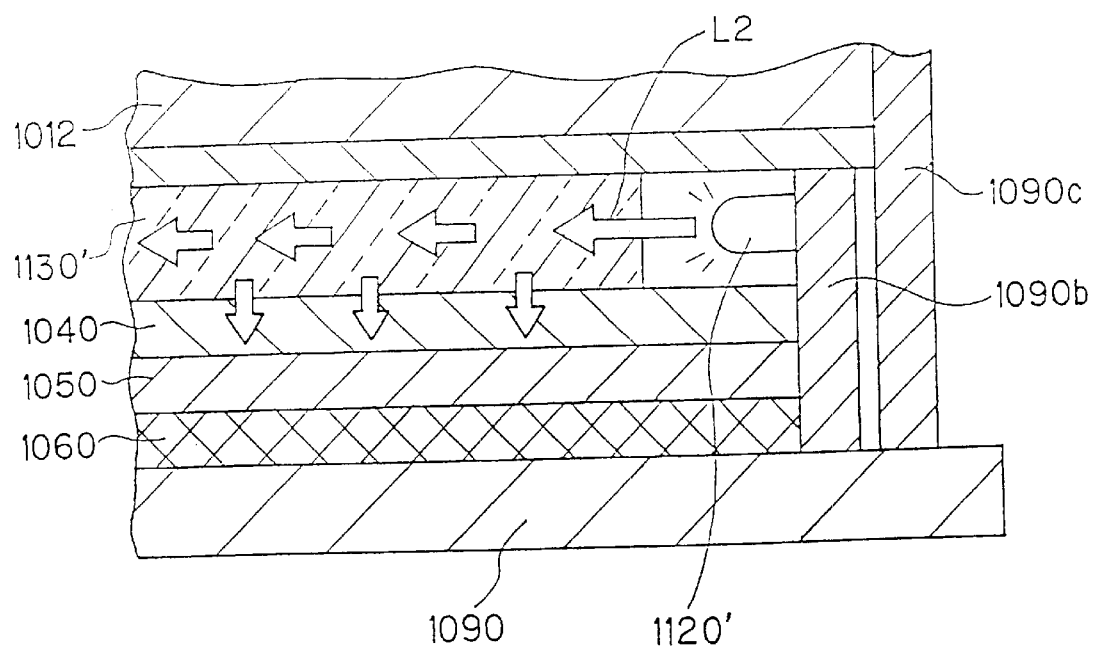
FIG. 11 is an enlarged sectional view showing a portion where light is incident on the light guide plate from a LED in another modified embodiment of the second embodiment of the present invention.

Furthermore, as modified embodiments of the second embodiment, a structure without the light guides 1110 can be used, as shown in FIGS. 10 and 11. FIGS. 10 and 11 are enlarged sectional views respectively showing the portions where light is incident on the light guide plate from LED in the modified embodiments. Namely, as shown in FIG. 10, a structure, in which light L1 is incident directly on the light guide plate 1130 from the LEDs 1120 disposed opposite to each other at the ends of the lower side of the light guide 1130, is available. In this case, the light guide plate 1130 and a lower glass plate 102, etc. may be fixed by a frame 1090*a* provided on the PCB substrate 1090 in a standing condition. Alternatively, as shown in FIG. 11, a structure, in which light L2 is incident on a light guide plate 1130' from LEDs 1120' disposed opposite to each other at the ends of the light guide plate 1130', is also available. In this case, the LEDs 1120' may be fixed by a frame 1090*b* provided on the PCB substrate in a standing condition, and the light guide plate 1130', the lower glass plate 1012, etc. may be fixed by a frame 1090*c* provided on the PCB substrate 1090 in a standing condition.

Figure 12A:
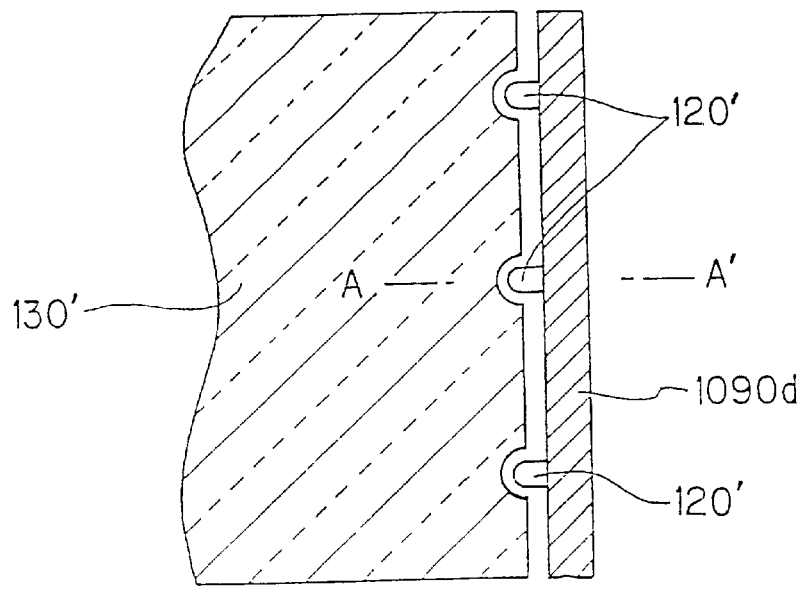
FIG. 12(a) is an enlarged horizontal sectional view taken along the level of a LED, showing a portion where light is incident on the light guide plate from the LED in a modified embodiment of the first embodiment of the present invention.
Figure 12B:
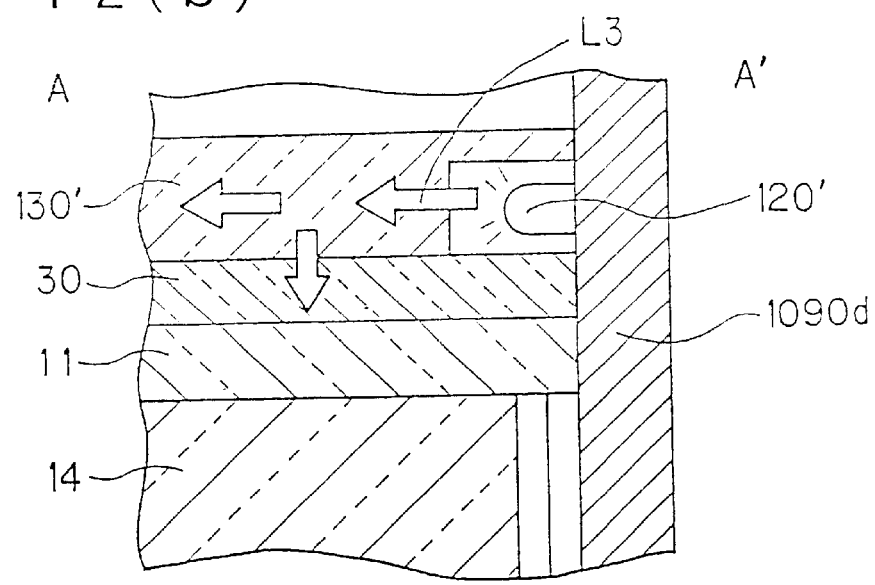
FIG. 12(b) is a sectional view taken along line A-A' in FIG. 12(a)

Similarly, as a modified embodiment of the first embodiment, a structure without the light guides 110 can be used, as shown in FIG. 12. FIG. 12(*a*) is an enlarged horizontal sectional view taken along the level of LED, showing a portion of in which light is incident on the light guide plate from LED in modified embodiment, and FIG. 12(*b*) is a sectional view taken along line A–A' of FIG. 12(*a*). Namely, as shown in FIGS. 12(*a*) and 12(*b*), light L3 may be incident directly on a light guide plate 130' from LEDS 120' disposed opposite to each other at the ends of the light guide plate 130'. In this case, the LEDs 1120', the light guide plate 130', etc. may be fixed by a frame 1090*d* provided on the PCB substrate 1090 in a standing condition. In this modified embodiment, particularly, in addition to that the light guides 110 are not provided, the light guide plate 130' has concave portions formed for respectively containing the LEDs 120', thereby improving the efficiency of utilization of light of the LEDs 120'.

As described above, in the second embodiment, the light from the light guide 1110 is applied from the upper side of the lower polarized light separator 1050, and external light is also applied from the upper side of the lower polarized light separator 1050. Therefore, like the first embodiment, the display states obtained in display due to external light in accordance with the on-off state of the liquid crystal 1014 are the same as display due to light from the light guides 1110. As a result, there is no problem of the positive-negative reversal between display due to external light and display due to light (light from the lEDs 1120) from the light guides 1110.

Further, like in the first embodiment, bright white display is obtained when no voltage is applied, and multicolor display with high purity is obtained by gray scale driving when the voltage is applied.

Third Embodiment

Figure 13:
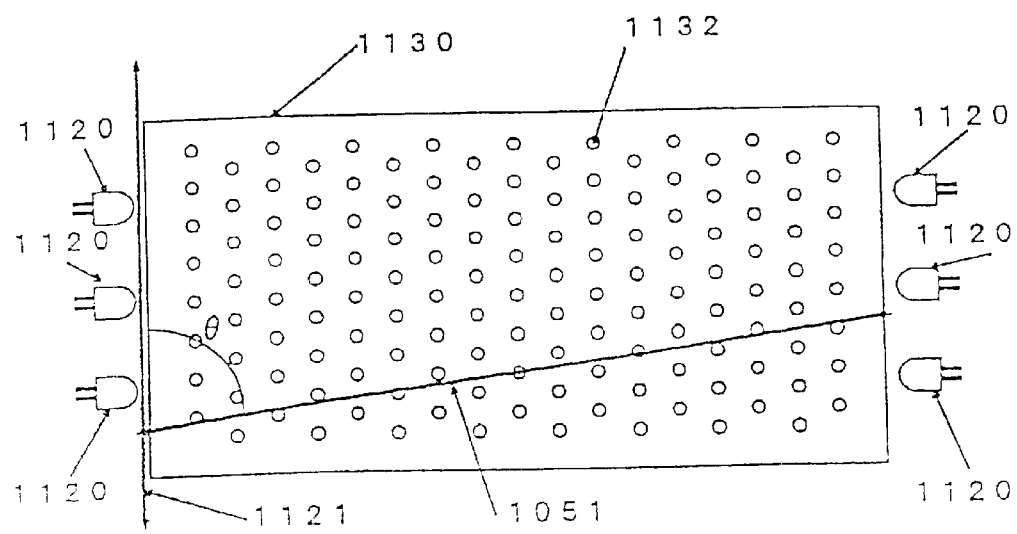
FIG. 13 is a schematic plan view illustrating the portion including a LED and a light guide plate of a liquid crystal display device in accordance with a third embodiment of the present invention.

FIG. 13 is a schematic drawing illustrating a portion of a liquid crystal display device in accordance with a third embodiment of the present invention. Namely, FIG. 13 shows the positions of the light guide plate 1130 and the LEDs 1120 shown in FIG. 8, and the transmission axis of the lower polarized light separator 1050. Reference numeral 1132 denotes projections.

Particularly, in the third embodiment, in the construction of the second embodiment, the transmission axis 1051 of the lower polarized light separator 1050 is arranged in a direction approximately perpendicular to the direction 1121 of arrangement of the LEDs 1120. In the third embodiment, the other construction is the same as the second embodiment shown in FIG. 8.

This arrangement of the lower polarized light separator 1050 brightens display with the LEDs turned on. Namely, the light emitted from the light guide plate 1130 is polarized during passage in the light guide plate 1130, in which the degree of polarization in the direction 1121 of arrangement of the LEDs 1120 is higher. The light in the direction 1121 of arrangement of the LEDS 1120 is reflected to the liquid crystal 1014 by the lower polarized light separator 1150 to improve efficiency and brighten display. Therefore, the direction of the reflection axis of the lower polarized light separator 1050 preferably aligns with the direction 1121 of arrangement of the LEDs 1120. In other words, preferably, the transmission axis 1051 of the lower polarized light separator 1050 is arranged perpendicularly to the direction 1121 of arrangement of the LEDs 1120. The angle θ formed by the direction 1121 of arrangement of the LEDs 1120 and the transmission axis 1051 is preferably set to 60 to 90°.

Fourth Embodiment

In a fourth embodiment, particularly, Lumistee produced by Sumitomo Chemical Co., Ltd. is used as the light guide plate 1130, in the second embodiment. In the fourth embodiment, the other construction is the same as the second embodiment shown in FIG. 8.

Lumistee produced by Sumitomo Chemical Co., Ltd. comprises layers having different refractive indexes is arranged with intervals of about 3 μm. This structure causes diffraction of light and thus diffusion of light. By adjusting the layer structure, the direction of diffused light can be controlled, thereby causing the property of making the angle of outgoing light to be different from the angle of incident light. As a result, the light being incident from the side to the light guide plate 1130 can be emitted from the surface thereof.

Therefore, this embodiment has the same effect as the second embodiment.

Fifth Embodiment

Figure 14:
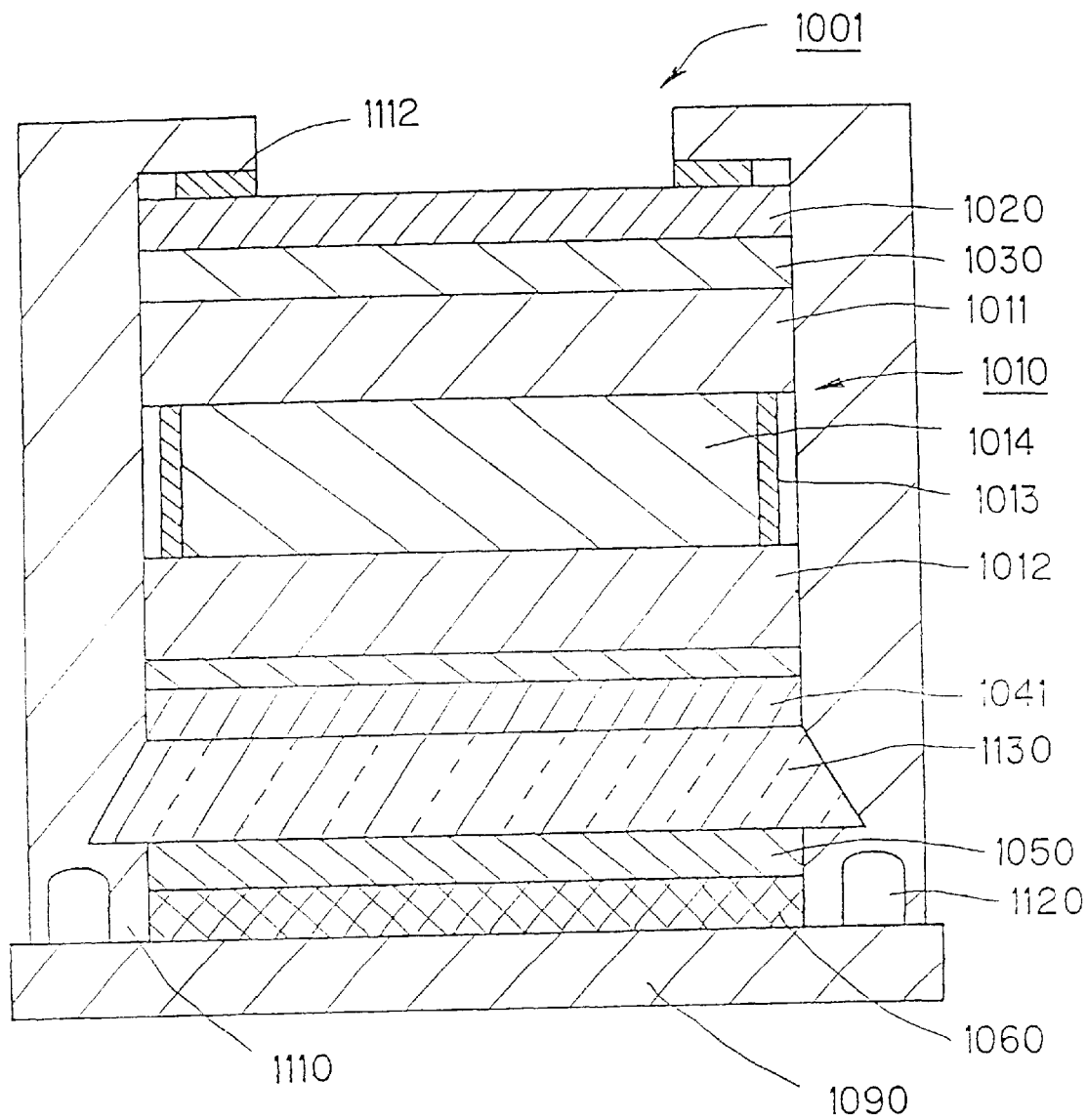
FIG. 14 is a schematic sectional view illustrating a liquid crystal display device in accordance with a fifth embodiment of the present invention.

FIG. 14 is a schematic sectional view illustrating a liquid crystal display device in accordance with a fifth embodiment.

In the fifth embodiment, a light diffuser 1041 is provided on the light guide plate 1130 in place of the light diffuser-containing adhesive 1040 provided in the second embodiment. In the fourth embodiment, the other construction is the same as the second embodiment shown in FIG. 2.

In the fifth embodiment, in addition to the same effect as the second embodiment, the shadow at the lighting display portion which significantly occurs in the second embodiment is thinned by the light diffuser 1041. This is due to the fact that the diffusion layer is provided nearer the liquid crystal layer.

Sixth Embodiment

Figure 15:
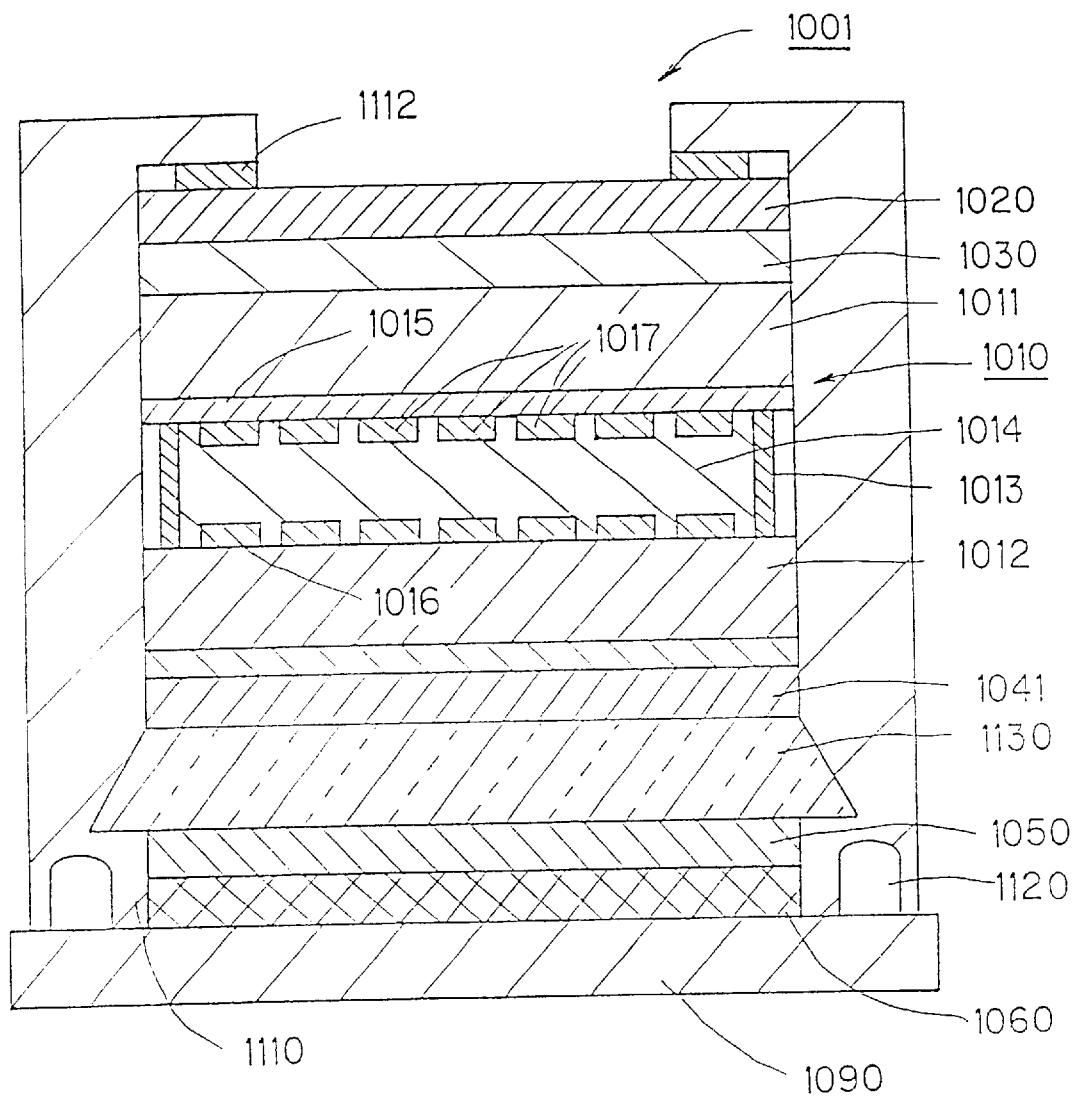
FIG. 15 is a schematic sectional view illustrating a liquid crystal display device in accordance with a sixth embodiment of the present invention.

FIG. 15 is a schematic sectional view illustrating a liquid crystal display device in accordance with a sixth embodiment of the present invention.

In the sixth embodiment, red, green and blue color filters 1017 are provided on the transparent electrode 1015 of the upper glass substrate 1011 in correspondence with the transparent electrode lines 1016 of the lower glass substrate 1012 provided in the fifth embodiment. However, the product $\Delta n \times d$ of the optical anisotropy $\Delta n$ of the liquid crystal 1014 of the liquid crystal cell 1010 and the thickness d of the liquid crystal layer thereof is changed to 860 nm, and the retardation film 1030 is used for compensation for colors. The liquid crystal cell 1010 is driven in a no-frame gray scale driving manner. In the sixth embodiment, the other construction is the same as the fifth embodiment shown in FIG. 14.

In this construction, bright full color display can be obtained under either external light or when the LED is turned on.

Besides, when a plastic thin film having a thickness of 0.12 mm or less is used in place of the lower glass substrate 1012, bright full color display with high purity can be obtained.

Seventh Embodiment

Figure 16:
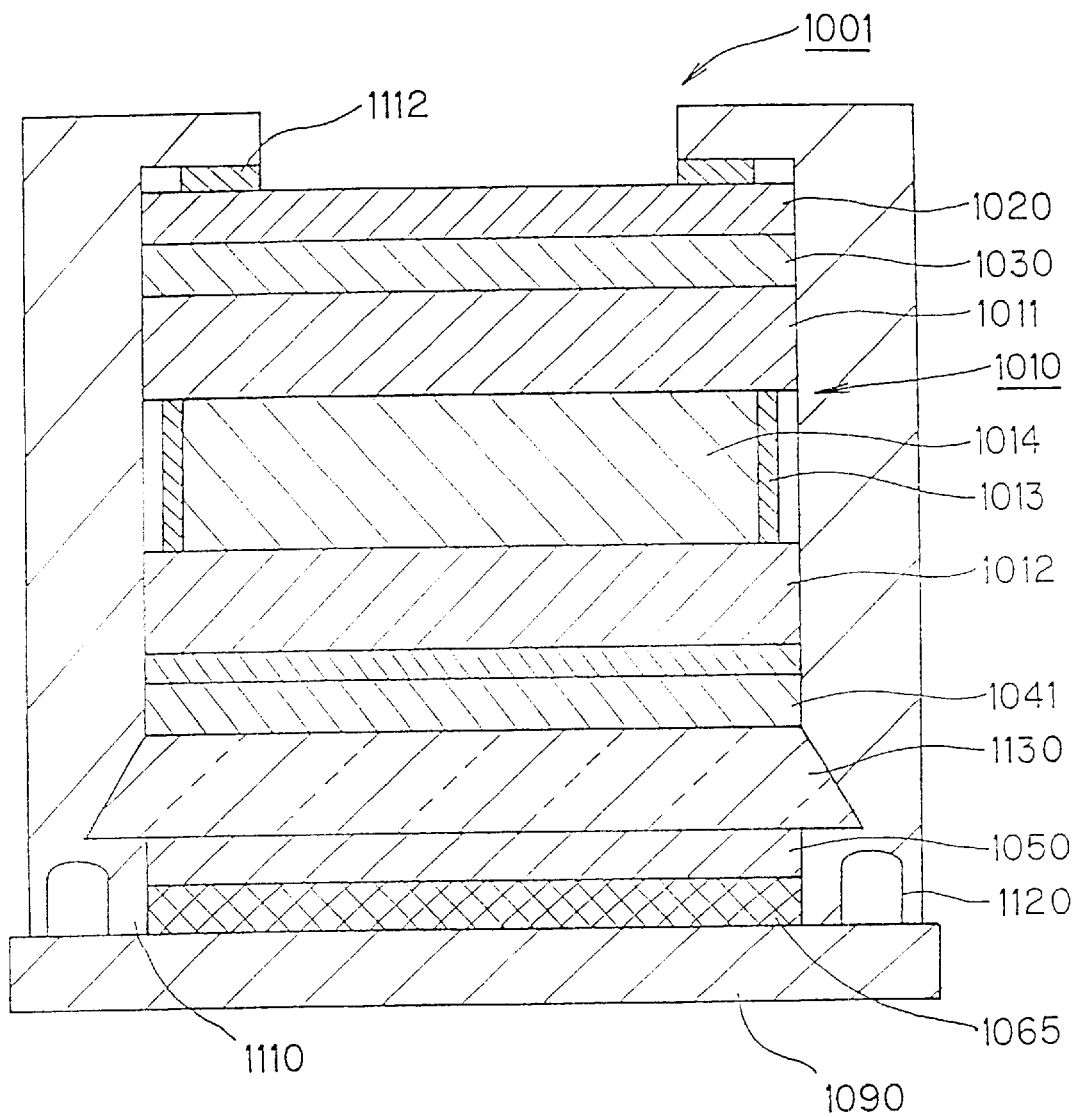
FIG. 16 is a schematic sectional view illustrating a liquid crystal display device in accordance with a seventh embodiment of the present invention.

FIG. 16 is a schematic sectional view illustrating a liquid crystal display device in accordance with a seventh embodiment.

In the seventh embodiment, a fluorescent material 1065 is used in place of the an light absorber in black color 1060 used in the fifth embodiment. In the seventh embodiment, the other construction is the same as the fifth embodiment shown in FIG. 14.

By using the fluorescent material 1065, the voltage applied portion of the liquid crystal is brightened under either external light or when the LED is turned on, thereby obtaining further bright display.

Eighth Embodiment

Figure 17:
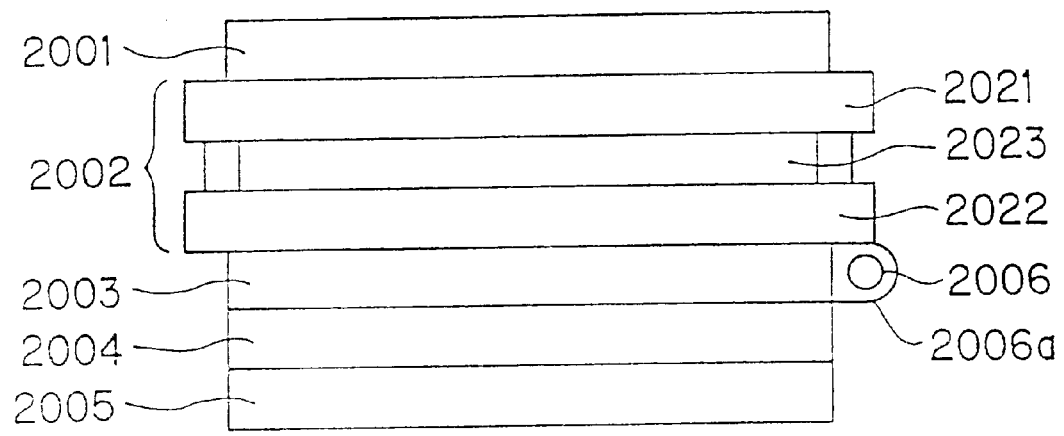
FIG. 17 is a schematic sectional view illustrating a liquid crystal display device in accordance with an eighth embodiment of the present invention.

FIG. 17 is a schematic sectional view illustrating a liquid crystal display device in accordance with an eighth embodiment of the present invention.

In FIG. 17, the liquid crystal display device comprises an upper polarizer 2001, a liquid crystal panel 2002, a light diffusion layer 2003, a polarized light separator 2004 and a light absorber 2005, which are laminated in this order, and a light source 2006 provided on the lateral side of the light diffusion layer 2003. A reflector 2006a is provided around the light source 2006.

As the upper polarized light separator 2001, the same as the upper polarizer 1020 in the second embodiment shown in FIG. 8 can be used. The liquid crystal panel 2002 comprises a liquid crystal layer 2023 held between a pair of substrates 2021 and 2022 made of glass or the like. As the liquid crystal layer 2023, any one of various liquid crystals such as a TN liquid crystal, a STN liquid crystal, and other conventional known liquid crystals can be used.

Like the light guide plate 1130 in the second embodiment shown in FIG. 8, the light diffusion layer 3 has the function to guide light from the light source 2006 to between the liquid crystal panel 2002 and the polarized light separator 2004, as well as the function to diffuse light.

As the light diffusion layer 2003, any material is appropriate as far as it can diffuse light, for example, a milky plastic plate made of an acrylic resin, a polycarbonate resin or the like, or a transparent or semitransparent plastic plate can be used. A reduction in the thickness of the light diffusion layer 2003 prevents parallax, and conversely, an increase in the thickness of the same to some extent causes thinning of the shadows of display pixels or the like to make the shadows unnoticeable. In order to decrease parallax, the thickness of the light diffusion layer is preferably 1.2 mm or less, more preferably 0.8 mm or less. Conversely, the measure of the thickness which can be increased without making shadows noticeable is preferably 2 mm or more. On the other hand, since the reflective index of the light diffusion layer 2003 cannot be increased, with a thickness of 0.2 mm or less, light is not diffused upward or downward. Therefore, the thickness is preferably 0.2 mm or more. In consideration of these points, the thickness of the light diffusion layer 2003 may be appropriately set.

By subjecting the light diffusion layer 2003 to the following processing according to demand, the efficiency of light emission can be increased. Namely, as shown in FIG. 18(a), the surfaces 2003a of the light diffusion layer 2003, particularly both the upper and lower surfaces or either one of the surfaces thereof, is roughed (made rough surfaces), as shown in FIG. 18(b), the light diffusion layer 2003 is filled with resin beads 2003b having a refractive index different from that of the light diffusion layer 2003, or as shown in FIG. 18(c), irregularity is formed in the surface 2003c of the light diffusion layer 2003. The shape of the irregularity is an appropriate shape such as the cylindrical shape or prismatic shape as shown in FIG. 19(a), the conical shape shown in FIG. 19(b), the substantially semispherical shape shown in FIG. 19(c), or the like. In carrying out the above processing, each of the surfaces may be formed by combination of any of the above processes.

As the light source 2006 arranged on the side of the light diffusion layer 2003, for example, a linear cathode ray tube or the like can be used, and not only a linear light source but also a point light source such as LED may be used. Although, in the drawing, the light source is provided on one side of the light diffusion layer 2003, the light source may be provided on both sides or over the entire periphery of the lateral side of the light diffusion layer.

Furthermore, as the light absorber 2005, for example, a black plastic film or sheet having good light absorption can be used, and for the material of them, any appropriate material can be used.

As described above, in the eighth embodiment, the light diffusion layer 2003 also functioning as a light guide plate is provided between the liquid crystal panel 2002 and the polarized light separator 2004 so that light is introduced into the light diffusion layer 2003 from the light source 2006 provided on the lateral side of the light diffusion layer 2003 to cause the light diffusion layer 2003 to emit light. Therefore, like in the second embodiment, transmissive display is possible at the time of light emission, and reflective display is possible in a no-emission of light state. Also, good display is possible without positive-negative reversal in both display modes.

As the material for the substrates 2021 and 2022 of the liquid crystal panel 2002 used in the present invention, not only the above-described glass but also a plastic sheet or plastic film may be used. The use of such material for the substrates has the advantages that a thin lightweight liquid crystal panel can be obtained, and also that the display panel has stronger resistance to mechanical breaking force such as vibration or the like, and further that curved-surface display is possible.

As the polarized light separator 2004 of the present invention, besides the above-described reflective polarizer (refer to FIG. 3), for example, a combination of a cholesteric liquid crystal layer and a (¼) λ plate, a separator for separating light into reflected polarized light and transmitted polarized light by using the angle of polarization (SID 92 DIGEST, pp. 427–429), a separator using a hologram, the separator disclosed in International Applications (International Publication Nos. WO95/27819 and WO95/17692), etc. can also be used. The various polarized light separators can be used in place of the reflective polarizer in each of the above embodiments and embodiments which will be described below.

The light absorber 2005 is not restricted to a black colored one and is capable of changing the color of lighting (color of non-lighting) optionally to any desired color by changing the wavelength of light absorbed by the light absorber 2005. In addition, by making the color of the light sources to be such as red, blue, etc., it is possible to make the impression of the display screen to be different when the liquid crystal panel is seen in a reflection mode, and when it is seen by using the light sources, thereby permitting display having design with aesthetic impression. Further, when the light absorber 2005 is colored in correspondence with the electrode pattern in place of the light absorber 2005 having one color, partial color display is possible.

(Modified Embodiment of the Eighth Embodiment)

Furthermore, beside above-mentioned modification, the liquid crystal display device of the eighth embodiment can be appropriately changed. For example, in order to remove the color generated in the liquid crystal panel 2002, a retardation plate or retardation film can be provided in the liquid crystal display device. Modified embodiments of the eighth embodiment will be described with reference to FIGS. 20 to 26.

Figure 20:
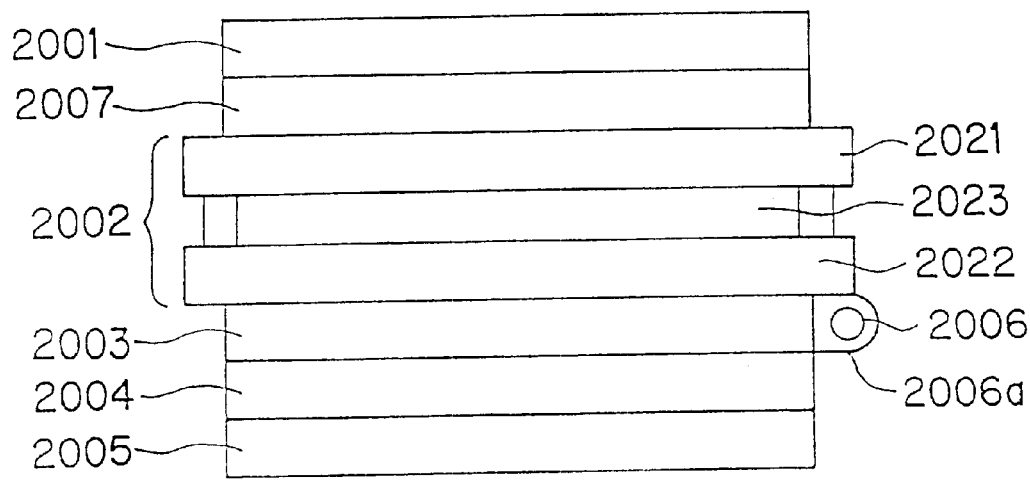
FIG. 20 is a schematic sectional view illustrating a modified embodiment of the eighth embodiment of the present invention.

FIG. 20 is shows an embodiment in which a retardation plate 2007 is interposed between the upper polarizer 2001 and the liquid crystal panel 2002. As the retardation plate 2007, various conventional known materials can be used. The other construction is the same as the eighth embodiment.

Figure 21:
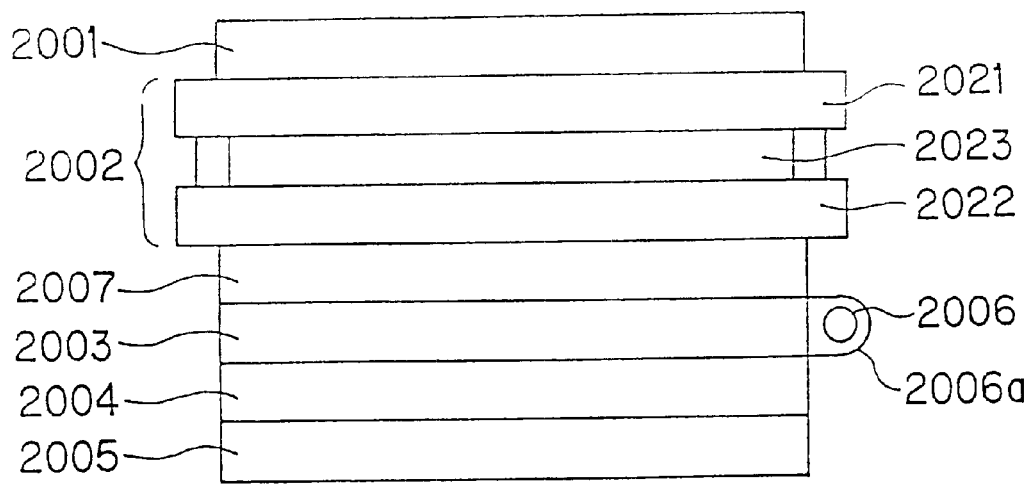
FIG. 21 is a schematic sectional view illustrating another modified embodiment of the eighth embodiment of the present invention.

FIG. 21 shows an embodiment in which the retardation plate 2007 is interposed between the liquid crystal panel 2002 and the light diffusion layer 2003. As the retardation plate 2007, various conventional known materials can be used. The other construction is the same as the eighth embodiment.

Figure 22:
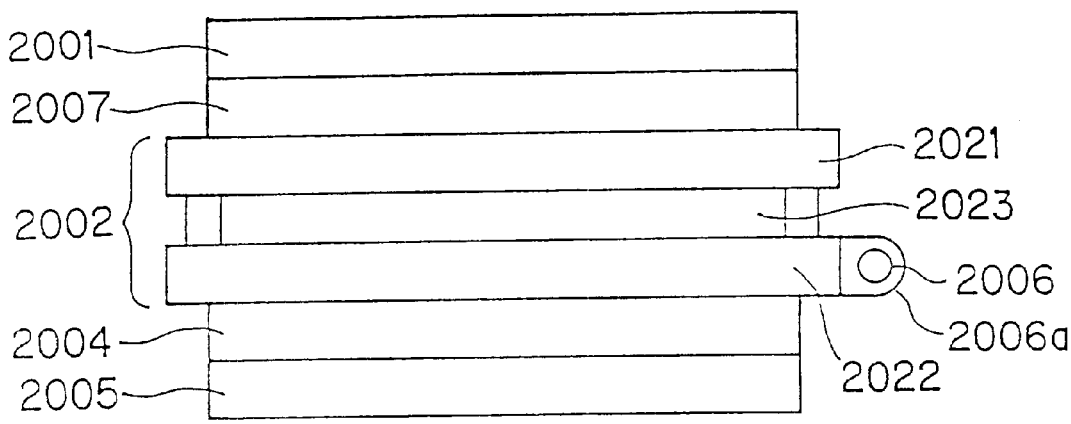
FIG. 22 is a schematic sectional view illustrating still another modified embodiment of the eighth embodiment of the present invention.

FIG. 22 shows an embodiment in which the lower substrate 2022 of the liquid crystal panel 2002 is also used as a light diffusion layer. The use of the lower substrate 2022 as the light diffusion layer eliminates the need to separately provide the light diffusion layer, thereby thinning the liquid crystal display device. This also permits a decrease in parallax.

Figure 23:
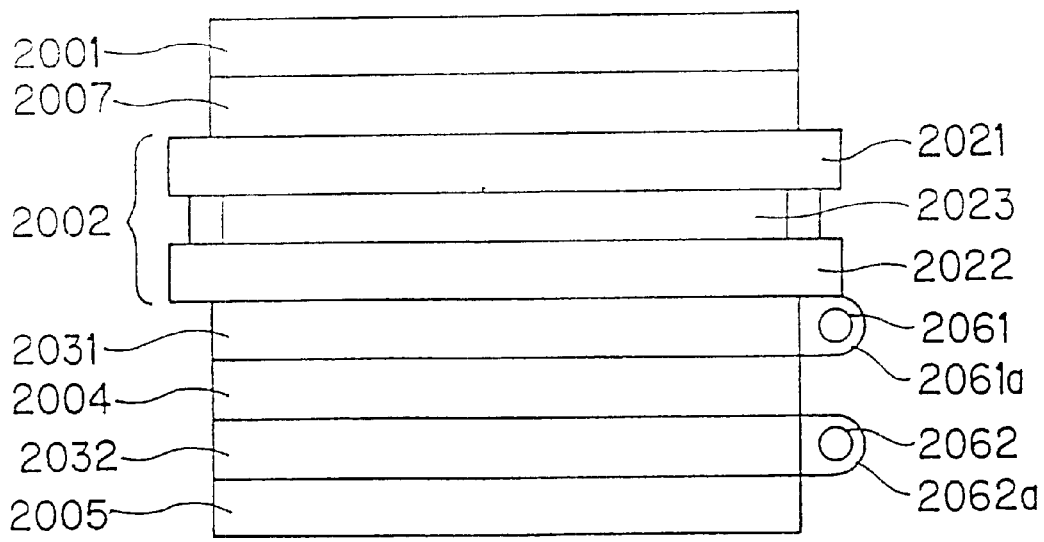
FIG. 23 is a schematic sectional view illustrating a further modified embodiment of the eighth embodiment of the present invention.

FIG. 23 shows an embodiment in which a light diffusion layer 2031 is provided between the liquid crystal panel 2002 and the polarized light separator 2004, a light diffusion layer 2032 is provided between the polarized light separator 2004 and the light absorber 2005, and further, light sources 2061 and 2062 and reflectors 2061a and 20621a are provided on one lateral side of the light diffusion layers 2031 and 2032, respectively. In this construction, in the transmissive display mode in which the upper light source 2061 is turned on, no positive-negative reversal occurs, and consequently, the same display as the reflective display can be obtained, while in the transmissive display mode in which the lower light source 1062 is turned on, positive-negative reversal occurs, and consequently, display is reversed from the reflective display. Namely, the black-white display modes can be reversed by selectively switching the light sources 2061 and 2062, thereby eliminating conventional processing for reversing signal data or rotating the axis of a polarizer for 90° in order to reverse the display mode. It is also possible to realize display having design with aesthetic impression by changing the colors of the light emitted from the light sources 2061 and 2062.

Figure 24:
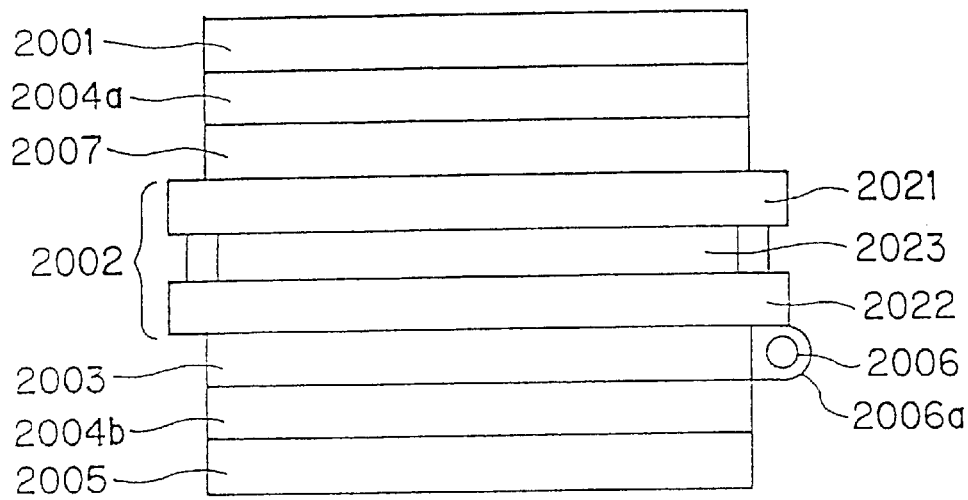
FIG. 24 is a schematic sectional view illustrating a still further modified embodiment of the eighth embodiment of the present invention.

FIG. 24 shows an embodiment in which polarized separators 2004a and 2004b are arranged on the upper and lower sides of the light crystal panel 2002. The upper polarized light separator 2004a is arranged between the polarizer 2001 and the retardation plate 2007 and the transmission axis of the upper polarized light separator 2004a aligns with that of the polarizer 2001. Therefore, with the light source 2006 turned on, upward light is reflected downward to increase the quantity of light, thereby further brightening the liquid crystal display device.

Figure 25:
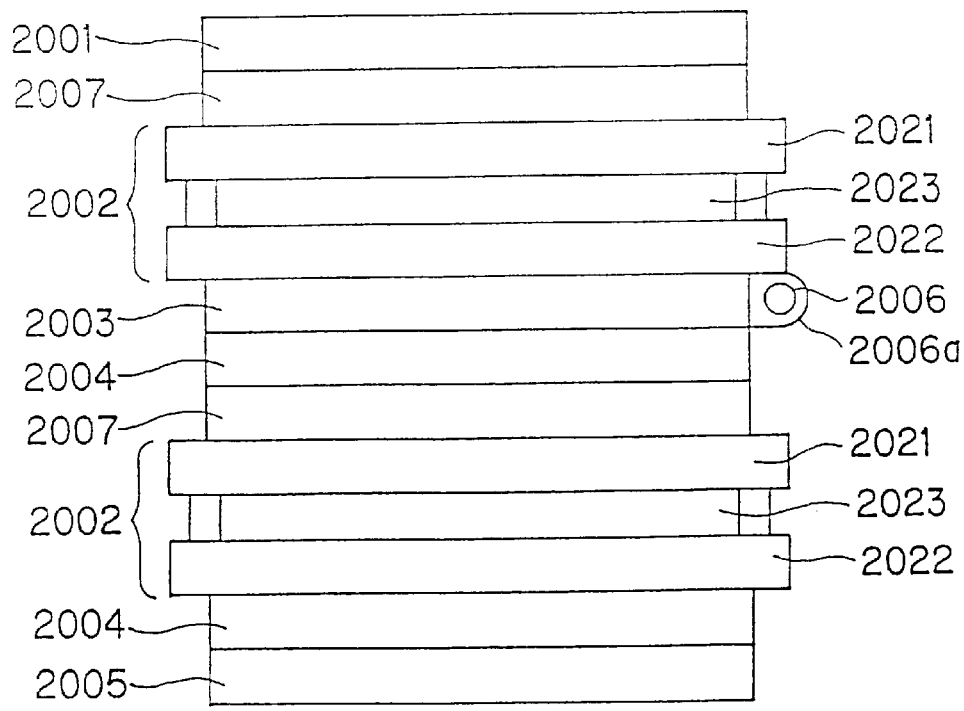
FIG. 25 is a schematic sectional view illustrating a further modified embodiment of the eighth embodiment of the present invention.

FIG. 25 shows an embodiment in which a plurality of liquid crystal panels 2002 each of which has a retardation plate 2002 provided on the upper side and a polarized light separator 2004 provided on the lower side thereof, respectively, are arranged between the polarizer 2001 and the light absorber 2005, the light diffusion layer 2003 is interposed between the upper liquid crystal panel 2002 and the polarized light separator 2004 thereof, and a light source 2006 and a reflector 2006a are provided on the side of the light diffusion layer 2003. By providing the plurality of liquid crystal panels, as described above, for example, multicolor display or the like having a plurality of colors is possible.

Figure 26:
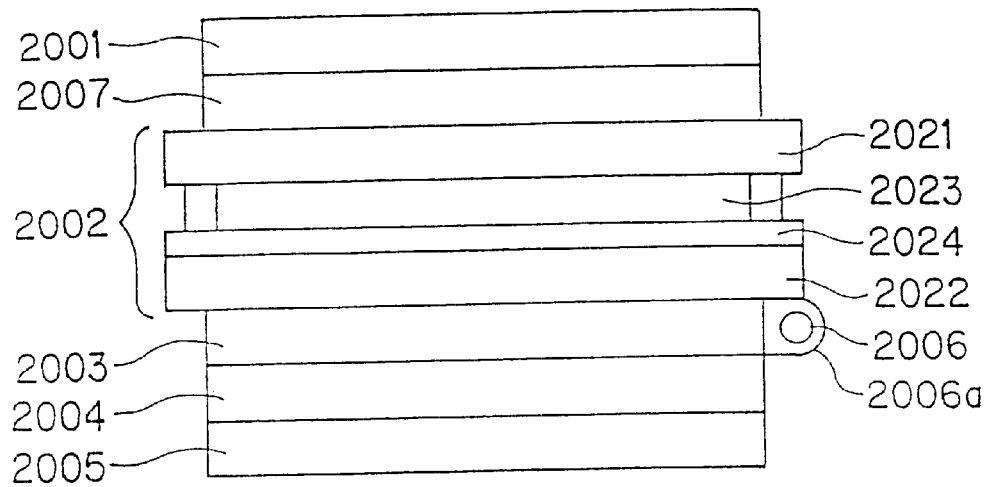
FIG. 26 is a schematic sectional view illustrating a further modified embodiment of the eighth embodiment of the present invention.

FIG. 26 shows an embodiment in which a color filter 2024 is provided between the liquid crystal layer 2023 and the substrate 2022 in the liquid crystal panel 2002. The color filter 2024 may be provided between the liquid crystal layer 2023 and the substrate 2021. In this construction, bright display can be obtained during reflection mode, and color display without positive-negative reversal can be obtained in a dark place by turning the light source on.

Ninth Embodiment

Figure 27:
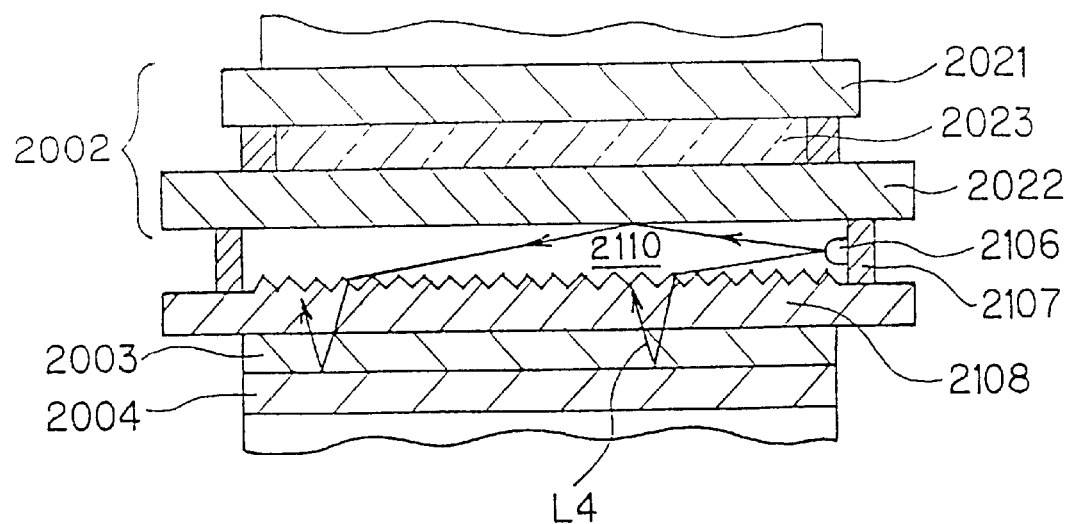
FIG. 27 is a schematic sectional view illustrating a light introduction portion of a liquid crystal display device in accordance with a ninth embodiment of the present invention.

FIG. 27 is a schematic sectional view illustrating a liquid crystal display device in accordance with a ninth embodiment of the present invention. In the ninth embodiment, the construction is characterized in that light is introduced into between the upper polarized light separator and the lower polarized light separator. The other construction is the same as each of the above embodiments. Therefore, the construction of the light introduction portion is described, but description of the other construction is omitted. Particularly, FIG. 27 is a schematic sectional view of the light introduction portion.

In the ninth embodiment shown in FIG. 27, a glass plate 2108 having a roughed upper surface is provided, through a spacer 2108, opposite to the lower side of the liquid crystal panel 2002 (refer to FIG. 17 and FIGS. 20 to 26) comprising the liquid crystal layer 2023 held between a pair of substrates 2021 and 2022, which is same as in the eighth embodiment. The light source 2106 such as LED or the like is provided at the end of the space (air layer) 2110 formed by the spacer 2107 between the substrate 2022 and the glass plate 2108 so that light from the light source 2106 is introduced into the space 2110. On the lower side of the glass substrate 2107, the light diffusion layer 2003 and lower polarized light separator 2004 (refer to FIG. 17 and FIGS. 20 to 26) are arranged, which are the same as the member in the eighth embodiment.

In the ninth embodiment, the light introduced into the space 2110 from the light source 2106 is incident on the glass plate 2108 through the rough upper surface thereof, and selectively reflected by the polarized light separator 2004 through the light diffusion layer 2003, as shown by arrows L4 in FIG. 27. The reflected light is transmitted through the glass plate 2108 and the space 2110, and incident to the liquid crystal panel 2002 from the lower side thereof.

In this embodiment, light can be introduced by using the space 2110 formed by the spacer 2107, in place of the light guide plate for introducing light between the upper and lower polarized light separators in each of the above embodiments.

Tenth Embodiment

Figure 28:
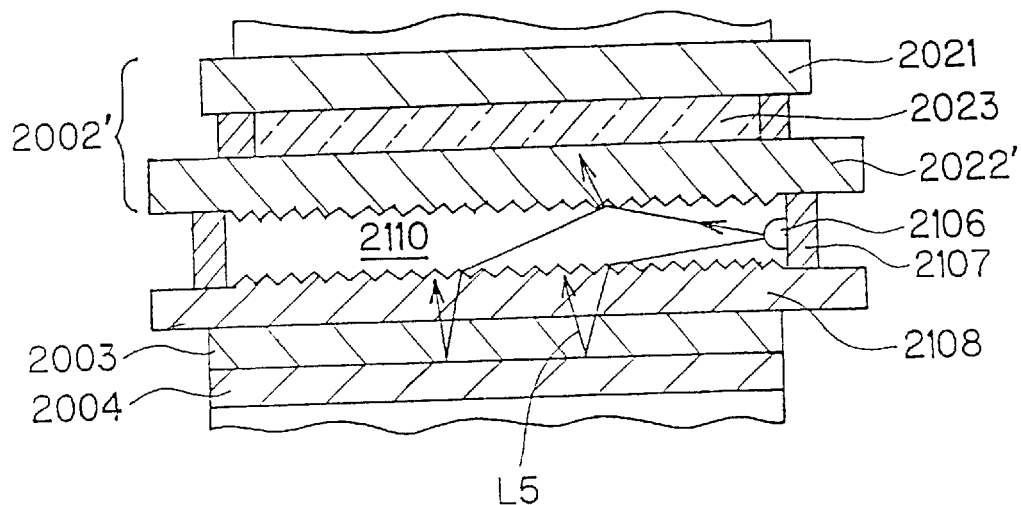
FIG. 28 is a schematic sectional view illustrating a light introduction portion of a liquid crystal display device in accordance with a tenth embodiment of the present invention.

FIG. 28 is a schematic sectional view illustrating a light introduction portion of a liquid crystal display device in accordance with a tenth embodiment of the present invention. As shown in FIG. 28, in the tenth embodiment, the lower surface of the lower substrate 2022' of the liquid crystal panel 2002' of the ninth embodiment is also roughed, and the other construction is the same as the ninth embodiment shown in FIG. 27.

In the tenth embodiment, the light introduced into the space 2110 from the light source 2106 is, on the one hand, incident to the glass plate 2108 through the upper rough surface of the glass substrate 2108, and selectively reflected by the polarized light separator 2004 through the light diffusion layer 2003 as shown by arrows L5, and on the other hand, incident to the liquid crystal panel 2002 from the lower side thereof through the lower rough surface of the substrate 2022'.

In this embodiment, light can be introduced by using the space 2110 formed by the spacer 2107 in place of the light guide plate for introducing light between the upper and lower polarized light separators in each of the above embodiments.

Eleventh Embodiment

Figure 29:
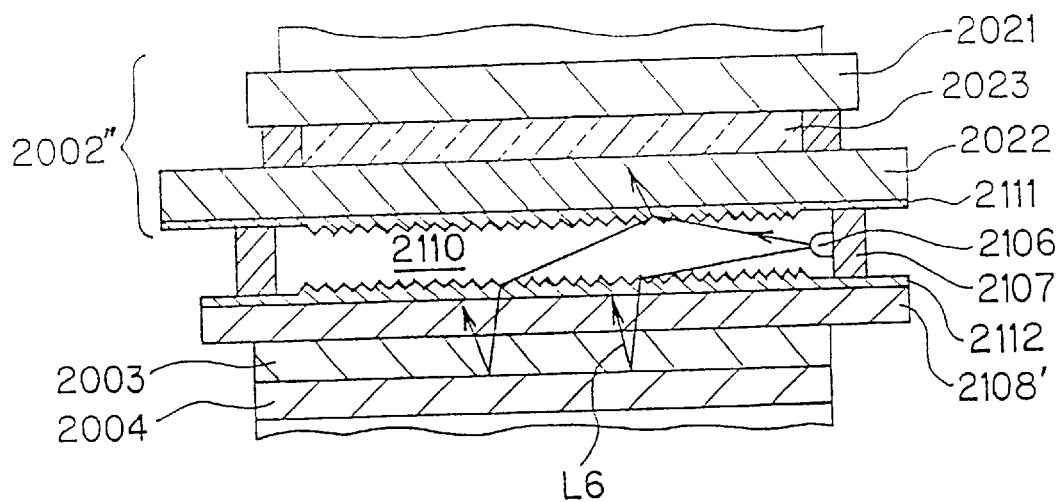
FIG. 29 is a schematic sectional view illustrating a light introduction portion of a liquid crystal display device in accordance with an eleventh embodiment of the present invention.

FIG. 29 is a schematic sectional view illustrating a light introduction portion of a liquid crystal display device in accordance with an eleventh embodiment of the present invention.

As shown in FIG. 29, the eleventh embodiment is different from the tenth embodiment in the point that a film 2111 having a roughed surface is attached to the lower side of the substrate 2022 so that at least the rough surface faces downward instead of making the lower surface in the substrate 2022' to be rough, and further in the point that a film 2112 having a roughed surface is attached to the upper side of a glass plate 2108' so that at least the rough surface faces upward instead of making the upper surface in the glass plate 2108 to be rough. The other construction is the same as the tenth embodiment shown in FIG. 28.

In the eleventh embodiment, the light introduced into the space 2110 from the light source 2106 is, on the one hand, incident to the glass plate 2108' through the film 2112, and selectively reflected by the polarized light separator 2004 through the light diffusion layer 2003, as shown by arrows L6, and on the other hand, incident to the liquid crystal panel 2002 from the lower side thereof through the film 2111.

In this embodiment, light can be introduced by using the space 2110 formed by the spacer 2107 in place of the light guide plate for introducing light between the upper and lower polarized light separators in each of the above embodiments.

In the above ninth to eleventh embodiments, the rough surfaces of the glass plate 2108, the substrate 2022', and the films 2111 and 2112 may be surfaces having various shapes of irregularities, as the light guide plates and the light diffusion layers described above with reference to FIGS. 4, 5, 9, 10, 18 and 19.

The above embodiments are examples, and various modifications can be made as far as they are not out of step with the aim of the present invention. For example, each of the embodiments shown in FIGS. 22 to 26 can also be applied to a display device without the retardation plate in the same manner.

Further, in each of the embodiments, although the light diffusion layer having no anisotropy is generally used because the use of a diffusion layer having optical anisotropy causes coloring, optical anisotropy may be intentionally imparted to the light diffusion layer. For example, in FIG. 21, the light diffusion layer 2003 having optical anisotropy can also be used in place of the retardation plate 2007. Also, in FIG. 21, the use of the light diffusion layer 2003 having optical anisotropy as the retardation plate 2007 can increase the effect of removing coloring of the liquid crystal panel.

Furthermore, in each of the embodiments, although the order or procedure for manufacturing the liquid crystal display device is appropriately selected, in providing the light source on the lateral side of the light diffusion layer, it is preferable to provide the light source on the lateral side of the light diffusion layer after attaching the arrangement of the polarized light separator to the plate-shaped light diffusion layer. This is because the projections of the light diffusion layers cause difficulties in attaching the polarized light separator.

Figure 30A:
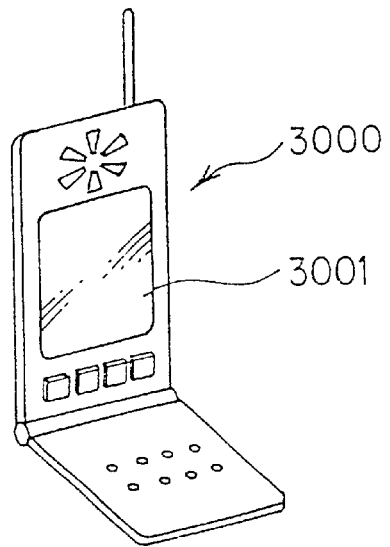
FIGS. 30(a), (b) and (c) are perspective view respectively showing examples of electronic apparatus of the present invention.
Figure 30B:
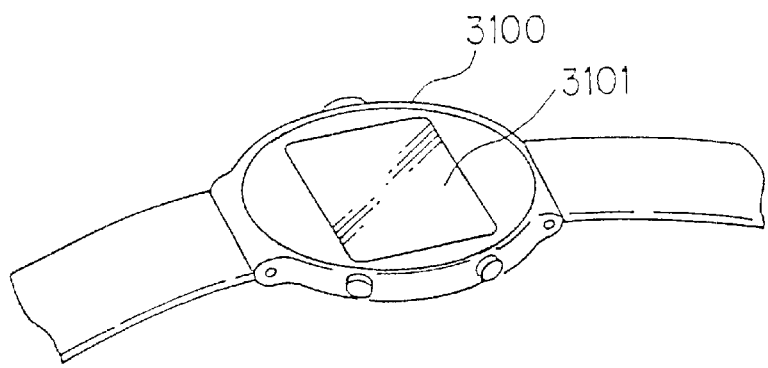
Figure 30C:
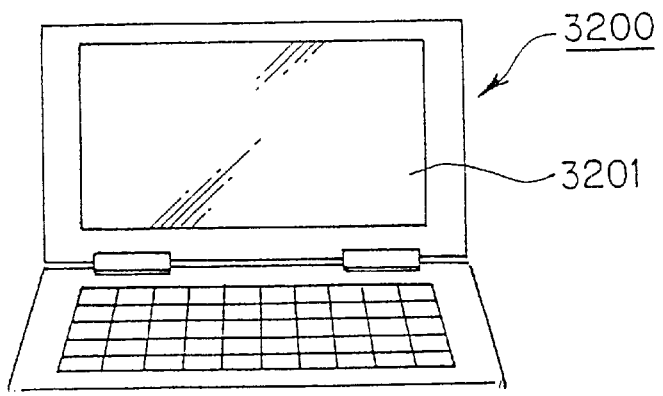
Figure 31:
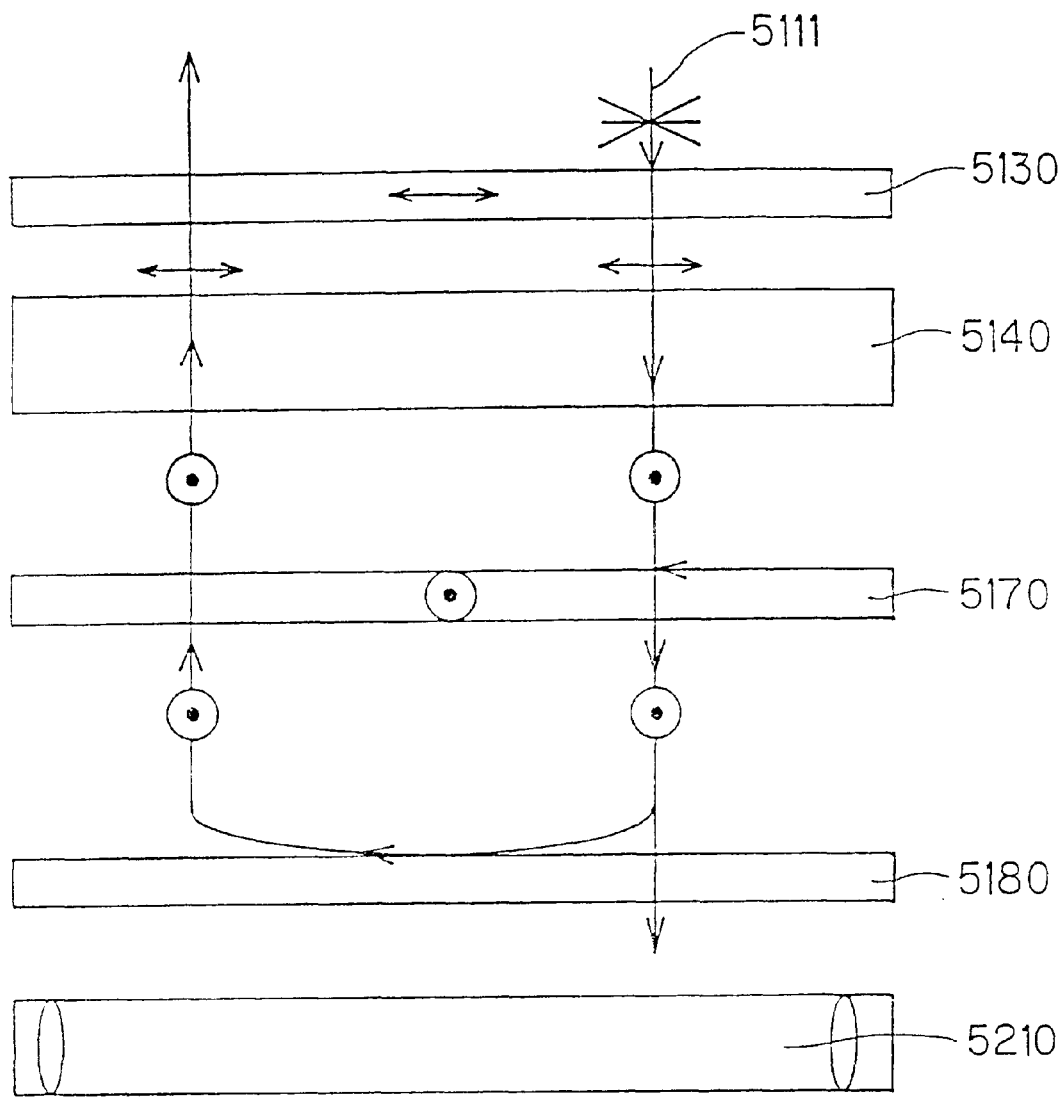
FIG. 31 is a sectional view of a transflective display device using a conventional polarizer.
Figure 32:
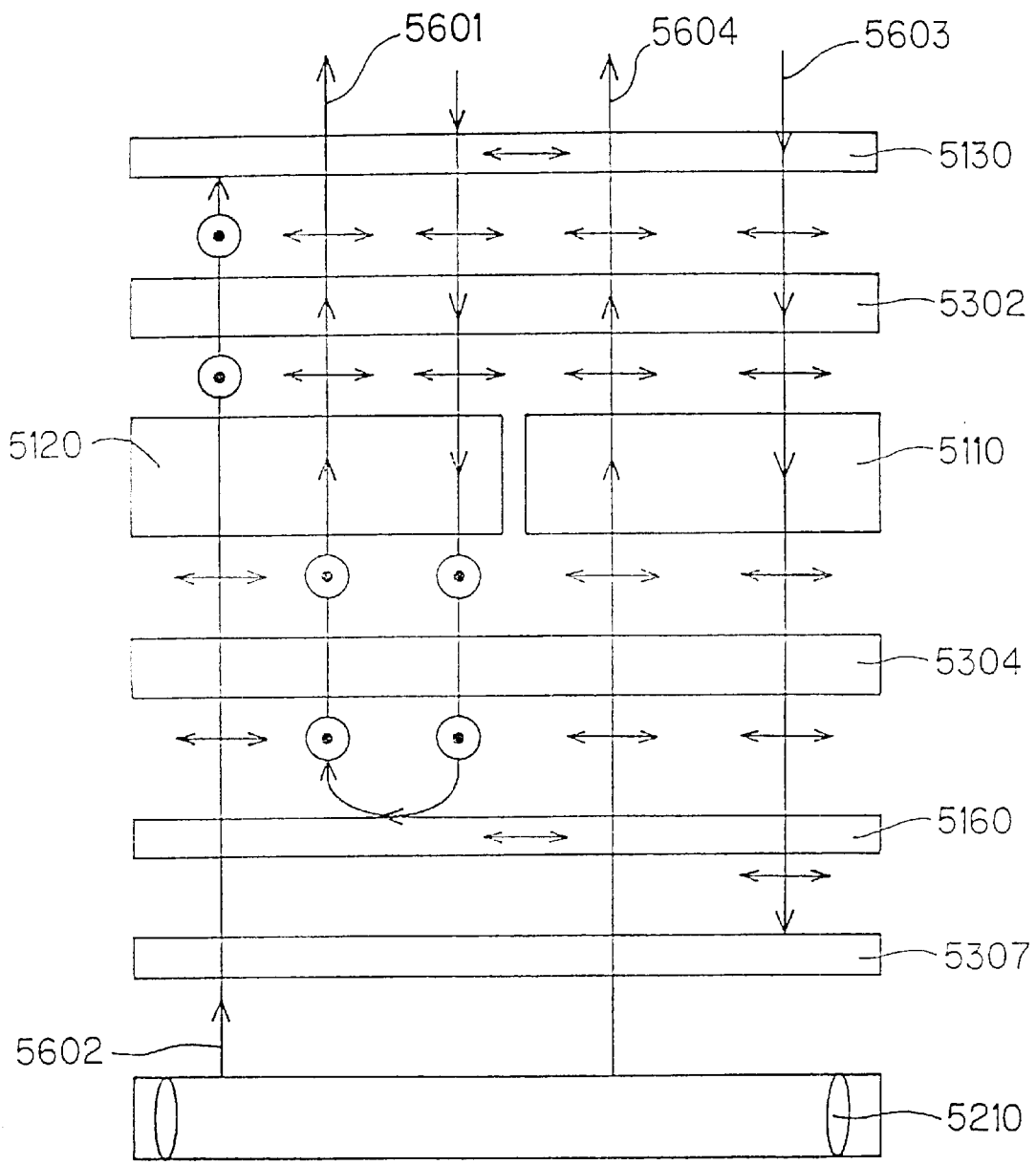
FIG. 32 is a sectional view of a transflective display device using a reflective polarizer invented by the inventors of this application.

By applying the liquid crystal display device of each of the above embodiments to a display unit 3001 of a portable telephone 3000, as shown in FIG. 30(a), for example, it is possible to realize an energy saving type portable telephone with high display quality in which reflective display is performed in the dark, and transmissive display is performed in the light. By applying the same to the display unit 3101 of a wrist watch 3100, as shown in FIG. 30(b), it is possible to realize an energy saving type wrist watch with high display quality in which reflective display is performed in the dark, and transmissive display is performed in the light. Further, by applying the same to the display unit 3101 of a personal computer 3200, as shown in FIG. 30(c), it is possible to realize an energy saving type personal computer with high display quality in which reflective display is performed in the dark, and transmissive display is performed in the light.

Besides the electronic apparatus shown in FIG. 30, the liquid crystal display device of each of the embodiments can be applied to electronic apparatus such as a liquid crystal television, a view finder type or monitor direct view type video tape recorder, a car navigation apparatus, an electronic notebook, an electric calculator, a word processor, an engineering work station (EWS), a television telephone, a POS terminal, apparatus with a touch panel, etc.

As described above, in each of the above embodiments of the present invention, the first polarized light separating means comprises the reflective polarizer so that reflected light is used for display, thereby obtaining brighter display, as compared with a conventional display device using a polarizer, a transflective reflector, or the like.

Also, in each of the embodiments of the present invention, since light is incident between the first polarized light separating means and the second polarized light separating means, the direction of the light incident is from the upper side of the first polarized light separating means during the both of reflective display and transmissive display. Therefore, unlike the display device proposed by the inventors in Japanese Patent Application No. 8-245346, no positive-negative reversal occurs. Also, the use of the light guide and the light guide plate causes an increase in freedom of the arrangement position of the light source, and an increase in design freedom of the display device.

Industrial Applicability

The display device of the present invention can be used as a display device which uses a liquid crystal device as a variable transmission polarization axis means and which are easy to see in both the dark and the light, and can also be used as a display device containing variable transmission polarization axis means other than a liquid crystal device. The electronic apparatus in accordance with the present invention comprises the display device of the invention and can be used as an energy saving type electronic apparatus or the like which is capable of displaying images with high quality in both the dark and the light.

What is claimed is:

1. A display device comprising:
   a variable transmission polarization axis device;
   a first polarized light separator disposed on a first side of said variable transmission polarization axis device, said first polarized light separator transmitting first linearly-polarized light and reflecting other linearly-polarized light;
   a second polarized light separator disposed on a second side of said variable transmission axis device, said second polarized light separator transmitting second linearly polarized light and reflecting or absorbing other linearly polarized light; and
   a light source for introducing light between said first and second polarized light separators said light guide including a transmissive light guide plate interdisposed between said second polarized light separator and said variable transmission polarization axis device.

2. The display device of claim 1 wherein said first polarized light separator further comprises a reflective polarizer.

3. The display device of claim 1 wherein said second polarized light separator further comprises a reflective polarizer.

4. The display device of claim 1 further comprising:
   a color filter disposed on a first side of said first polarized light separator opposite said variable transmission axis device for emitting light in a first wavelength range from said first polarized light separator to said second polarized light separator.

5. The display device of claim 4 further comprising:
   a reflector disposed on a first side of said color filter opposite said first polarized light separator for reflecting said light in said first wavelength range toward said color filter.

6. The display device of claim 1 further comprising:
   an absorber disposed on a first side of said first polarized light separator opposite said variable transmission polarization axis device for absorbing light in a visible light region.

7. The display device of claim 1 further comprising:
   a diffusion layer interdisposed between said first polarized light separator and said variable transmission polarization axis device.

8. The display device of claim 1 further comprising a light guide optically interconnecting said light source and said light guide plate.

9. The display device of claim 1 wherein said light guide plate further comprises a transmissive flat plate having a plurality of projections extending therefrom.

10. The display device of claim 1 wherein said variable transmission polarization axis device further comprises a liquid crystal.

* * * * *

UNITED STATES PATENT AND TRADEMARK OFFICE
CERTIFICATE OF CORRECTION

PATENT NO.   : 6,359,668 B1
DATED        : March 19, 2002
INVENTOR(S)  : Chiyoaki Iijima et al.

It is certified that error appears in the above-identified patent and that said Letters Patent is hereby corrected as shown below:

<u>Title page,</u>
Item [56], References Cited, FOREIGN PATENT DOCUMENTS, delete duplicate listings of "JP 9-506985 7/1997" and "WO 98/12595 3/1998"

Item [54], Inventors, "Ina" should be -- Nagano-ken --

<u>Column 8,</u>
Line 15, "eternal" should be -- external --
Line 59, delete "an"

<u>Column 14,</u>
Line 17, "view" should be -- views --

<u>Column 15,</u>
Line 16, "light guide 10" should be -- light guide 110 --
Line 21, "light guides 30" should be -- light guides 110 --
Line 21, "plate 30" should be -- plate 130 --
Line 27, "a" should be -- an --
Lines 56, 59 and 60, "µ" should be -- λ --
Line 65, "k" should be -- λ --

<u>Column 16,</u>
Line 17, "a" should be -- an --
Line 44, after "guide" insert -- plate --

<u>Column 19,</u>
Line 45, "polarize" should be -- polarized --

<u>Column 21,</u>
Line 56, "light" should be -- like --

<u>Column 22,</u>
Line 23, "104" should be -- 1014 --
Line 32, "110" should be -- 1110 --

<u>Column 23,</u>
Line 19, "102" should be -- 1012 --
Line 31, "110" should be -- 1110 --
Line 39, "LEDS" should be -- LEDs --
Line 44, "110" should be -- 1110 --
Line 58, "IEDs" should be -- LEDs --

UNITED STATES PATENT AND TRADEMARK OFFICE
CERTIFICATE OF CORRECTION

PATENT NO. : 6,359,668 B1
DATED : March 19, 2002
INVENTOR(S) : Chiyoaki Iijima et al.

It is certified that error appears in the above-identified patent and that said Letters Patent is hereby corrected as shown below:

Column 25,
Line 28, delete "an"

Column 27,
Line 33, delete "is"
Line 51, "20621a" should be -- 2062a --

Column 31,
Lines 2-3, delete "the" and delete "of"

Signed and Sealed this

Fifth Day of November, 2002

*Attest:*

*Attesting Officer*

JAMES E. ROGAN
*Director of the United States Patent and Trademark Office*